US009336267B2

(12) United States Patent
Ting

(10) Patent No.: US 9,336,267 B2
(45) Date of Patent: May 10, 2016

(54) METHOD AND SYSTEM FOR NAVIGATION AND VISUALIZATION OF DATA IN RELATIONAL AND/OR MULTIDIMENSIONAL DATABASES

(76) Inventor: Heng Toon Ting, Johor Bahru (MY)

(*) Notice: Subject to any disclaimer, the term of this patent is extended or adjusted under 35 U.S.C. 154(b) by 1274 days.

(21) Appl. No.: 11/548,308

(22) Filed: Oct. 11, 2006

(65) Prior Publication Data

US 2007/0130113 A1    Jun. 7, 2007

Related U.S. Application Data

(60) Provisional application No. 60/725,378, filed on Oct. 11, 2005.

(51) Int. Cl.
*G06F 17/30* (2006.01)

(52) U.S. Cl.
CPC .... *G06F 17/30392* (2013.01); *G06F 17/30554* (2013.01)

(58) Field of Classification Search
CPC ......... G06F 3/048; G06F 3/00; G06F 3/0481; G06F 3/0482; G06F 3/0483
USPC .......................... 715/764, 781, 783, 810, 763
See application file for complete search history.

(56) References Cited

U.S. PATENT DOCUMENTS

| | | | |
|---|---|---|---|
| 5,555,403 A | 9/1996 | Cambot et al. | |
| 5,832,496 A * | 11/1998 | Anand et al. | 707/102 |
| 6,167,396 A | 12/2000 | Lokken | |
| 6,195,094 B1 * | 2/2001 | Celebiler | 715/764 |
| 6,266,684 B1 * | 7/2001 | Kraus et al. | 715/209 |
| 6,282,547 B1 | 8/2001 | Hirsch | |
| 6,301,579 B1 | 10/2001 | Becker | |
| 6,425,120 B1 * | 7/2002 | Morganelli et al. | 717/109 |

(Continued)

FOREIGN PATENT DOCUMENTS

| | | |
|---|---|---|
| WO | 01/01206 A2 | 1/2001 |
| WO | 01/01206 A3 | 1/2001 |
| WO | 03032125 A2 | 4/2003 |

OTHER PUBLICATIONS

Ray Rankins, Paul Bertucci, Paul Jensen, Microsoft SQL Server 2000 Unleashed Second Edition, Dec. 18, 2002, Sams, pp. 1.*

(Continued)

*Primary Examiner* — Amy Ng
*Assistant Examiner* — Erik Stitt
(74) *Attorney, Agent, or Firm* — Volpe and Koenig, P.C.

(57) ABSTRACT

A computer-implemented design tool for the navigation and visualization of data in at least one relational and/or multidimensional database. The design tool allows a user to partition a display screen into a plurality of frames, to insert and configure controls within each frame to form a dashboard, the controls defining queries to the database(s) and any rules associated with those queries, and to create the dashboards in multiple levels for each of the frames. Configuring the controls permits a user to define drill actions for the controls within each dashboard to target dashboards in any of the multiple levels, both within the same frame as the starting dashboard, as well as in any or all of the other frames. The user-defined drill actions provide for powerful and highly flexible multi-path and multi-level navigation to achieve visualization of data in the database(s), by displaying on the display screen a respective target dashboard of any one of the multiple levels in each frame according to the controls selected by the user.

16 Claims, 38 Drawing Sheets

(56) References Cited

U.S. PATENT DOCUMENTS

| | | | |
|---|---|---|---|
| D473,565 S | 4/2003 | Groves | |
| 6,691,100 B1 | 2/2004 | Alavi et al. | |
| 6,727,927 B1* | 4/2004 | Dempski et al. | 715/853 |
| 6,782,528 B1* | 8/2004 | Bennett et al. | 717/109 |
| 6,788,315 B1* | 9/2004 | Kekic et al. | 715/733 |
| 6,801,910 B1 | 10/2004 | Bedell et al. | |
| 6,819,344 B2 | 11/2004 | Robbins | |
| 6,925,609 B1* | 8/2005 | Lucke | 715/804 |
| 7,117,452 B1* | 10/2006 | Pavelski et al. | 715/792 |
| 7,149,983 B1* | 12/2006 | Robertson et al. | 715/810 |
| 7,340,721 B1* | 3/2008 | Bailey | 717/109 |
| 7,716,592 B2* | 5/2010 | Tien et al. | 715/744 |
| 8,434,019 B2* | 4/2013 | Nelson | 715/798 |
| 2002/0147709 A1* | 10/2002 | Rajarajan et al. | 707/3 |
| 2002/0178185 A1* | 11/2002 | Kuchinsky et al. | 707/512 |
| 2003/0115207 A1 | 6/2003 | Bowman et al. | |
| 2003/0135481 A1* | 7/2003 | Helmes et al. | 707/1 |
| 2004/0030741 A1* | 2/2004 | Wolton et al. | 709/202 |
| 2004/0221259 A1* | 11/2004 | Devore et al. | 717/102 |
| 2005/0071737 A1 | 3/2005 | Adendorff et al. | |
| 2006/0015818 A1* | 1/2006 | Chaudhri et al. | 715/779 |
| 2006/0025679 A1* | 2/2006 | Viswanathan et al. | 600/424 |
| 2006/0031187 A1 | 2/2006 | Pyrce et al. | |
| 2006/0089889 A1 | 4/2006 | McCarthy, Jr. | |
| 2006/0089939 A1 | 4/2006 | Broda et al. | |
| 2006/0095858 A1 | 5/2006 | Hao et al. | |
| 2006/0101353 A1* | 5/2006 | Clark et al. | 715/792 |
| 2007/0101297 A1* | 5/2007 | Forstall et al. | 715/841 |
| 2007/0130113 A1 | 6/2007 | Ting | |

OTHER PUBLICATIONS

Ray Rankins, Paul Bertucci, Paul Jensen, Microsoft SQL Server 2000 Unleashed Second Edition, Dec. 18, 2002, Sams, Chapter 6, pp. 1-20.*

* cited by examiner

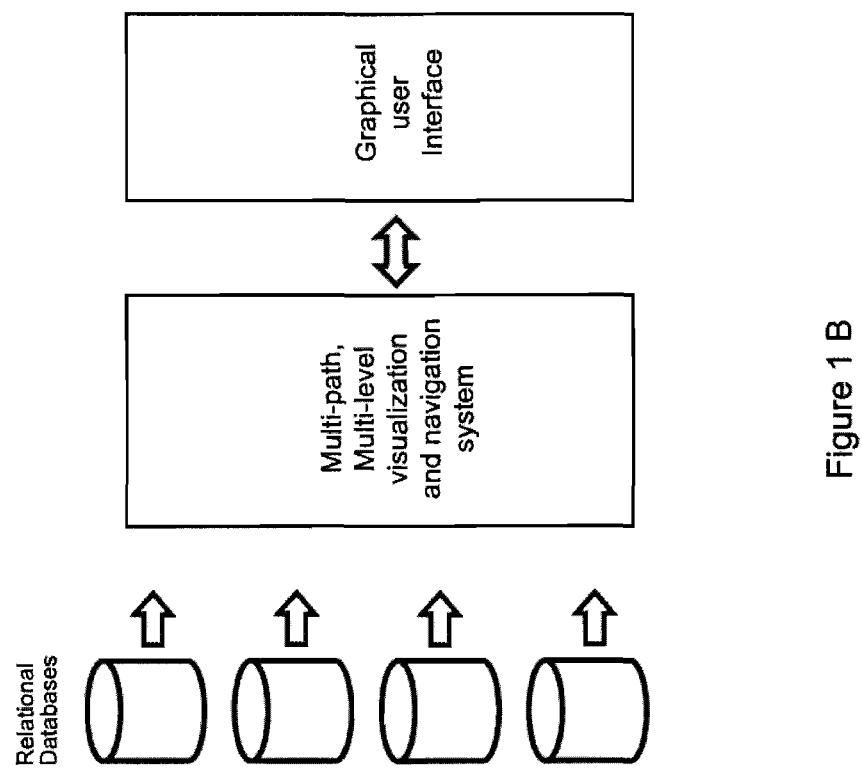

METHOD AND SYSTEM FOR NAVIGATION AND VISUALIZATION OF DATA IN RELATIONAL AND/OR MULTIDIMENSIONAL DATABASES

CROSS REFERENCE TO RELATED APPLICATIONS

This application claims benefit of U.S. Provisional Patent Application No. 60/725,378, filed Oct. 11, 2005, which is incorporated by reference as if fully set forth.

FIELD OF THE INVENTION

The present invention resides in the technical field of graphical user interfaces. It relates generally to a method and system for displaying data, and more particularly, to a method and system for navigating and visualizing data stored in relational and/or multidimensional databases.

BACKGROUND OF THE INVENTION

The advent of powerful computers made possible by technology advances in processor, data storage devices and memory, and together with higher network bandwidths facilitating the usage of Internet, has made computers an important part of modern day business. These advancements have led the path to the creation of important software applications where data is collected, organized and stored in relational databases. Subsequently, data from relational databases is mapped and populated to multidimensional databases where it is further organized in a multidimensional relationship manner.

The data in multidimensional databases can be defined and mapped along multiple dimensions. For example, the data in a sales multidimensional database may include dimensions for the different types of products, locations, customers, sales channels and time dimensions.

The ability to access and exploit data stored in these relational and/or multidimensional databases becomes an important aspect of businesses. As the types of data and volume increase, providing users with comprehensive and 'easy to use' navigation and visualization tools to make access, analysis and management of data from relational and/or multidimensional databases becomes increasingly important.

A goal of any information visualization system is to use computer graphics to utilize human perceptual processes and organize data in an informative and user-friendly manner. Thus, efforts have been made to develop tools for the display and visualization of data from relational and/or multidimensional databases.

Prior art navigation and visualization tools are too rigid in their presentation of data, and do not present a comprehensive view for the data that are being navigated and visualized. Furthermore, those traditional tools only allow users to design pre-defined, single path and single direction (one-way) navigation associated with 'one click' or command for the display and navigation of data from relational and/or multidimensional databases. Thus, the user may not be able to navigate through a relational and/or multidimensional database in a sequence of paths that fits the business requirements or the user's particular thought process.

There is thus a need for an improved computer-implemented method and system that provide multi-path and multi-level navigation for the display and visualization of data stored in relational and/or multidimensional databases.

There is another need for an improved computer-implemented method and system that provide users with a comprehensive graphical view of the data stored in a relational and/or multidimensional database, while the user navigates in a sequence of paths that fits the user's business requirements and thought process.

There is yet another need for an improved computer-implemented method and system that provide users with a comprehensive business intelligence system, while the user collaborates and communicates with respect to the information displayed from the relational and/or multidimensional databases.

There is still yet another need to provide an improved computer-implemented method and system for navigating and displaying data stored in relational and/or multidimensional databases, which is comprehensive and user-friendly.

The present invention provides such a method and system to meet the above four and other needs.

SUMMARY OF THE INVENTION

To overcome the shortcomings in the prior art, the present invention provides a novel method to navigate and display data stored in relational and/or multidimensional databases.

In one embodiment, the invention provides a computer-implemented business intelligence tool for the navigation and visualization of data in at least one relational and/or multidimensional database. The design tool allows a user to partition a display screen into a plurality of frames, to insert and configure controls within each frame to form a dashboard, the controls defining queries to the database(s) and any rules associated with those queries, and to create the dashboards in multiple levels for each of the frames. Configuring the controls permits a user to define drill-actions for the controls within each dashboard to target dashboards in any of the multiple levels, both within the same frame as the starting dashboard, as well as in any or all of the other frames. The user-defined drill-actions provide for powerful and highly flexible multi-path and multi-level navigation to achieve visualization of data in the database(s), by displaying on the display screen a respective target dashboard of any one of the multiple levels in each frame according to the controls selected by the user.

In a broad aspect, the invention provides a method and system for the navigation and visualization of data stored in relational and/or multidimensional databases. The invention provides user access to data through a user-friendly interface that allows the user to view, understand and navigate data from relational and/or multidimensional databases.

Implementation of the invention includes the following.

In accordance with an aspect of the present invention, there is provided a method in a computer system for the visualization and navigation of data from relational and/or multidimensional databases. The method comprises of defining business module(s) which may be used to better display information for the specific business purpose and objectives. Business module(s) may be Sales Module, Finance Module, Operations Module etc. or it can be a combination of different business objectives into one single business module.

In accordance with an aspect of the present invention, there is provided a system for the visualization and navigation of data from relational and/or multidimensional databases. The system comprises of means for defining business module(s) which may be used to better display information for the specific business purpose and objectives. Business module(s) may be Sales Module, Finance Module, Operations Module etc. or it can be a combination of different business objectives into one single business module.

In accordance with another aspect of the present invention, there is provided a method in a computer system for the visualization and navigation of data from relational and/or multidimensional databases. The method comprises of partitioning the business module(s) as seen on the computer screen into different frames. The purpose of these partitions is to enable the multi-path and multi-level navigations. The frames are used to house controls (charts, dials, GIS (Geographical Information System) generated maps, images, icons, commentary box, buttons, color-coded alert buttons, labels, pivot tables, etc.) which may be linked to data sources in the form of queries to relational and/or multidimensional databases.

In accordance with another aspect of the present invention, there is provided a system for the visualization and navigation of data from relational and/or multidimensional databases. The system comprises of means for partitioning the business module(s) as seen on the computer screen into different frames. The purpose of these partitions is to enable the multi-path and multi-level navigations. The frames are used to house controls (charts, dials, GIS (Geographical Information System), images, commentary box, buttons, alert buttons, pivot tables, etc.) which may be linked to data sources in the form of queries to relational and/or multidimensional databases.

In accordance with another aspect of the present invention, there is provided a method in a computer system for the visualization and navigation of data from relational and/or multidimensional databases. The method comprises of inserting controls (charts, dials, GIS (Geographical Information System), images, icons, commentary box, buttons, color-coded alert buttons, labels, pivot tables, etc.) into the defined frames of the business module(s).

In accordance with another aspect of the present invention, there is provided a system for the visualization and navigation of data from relational and/or multidimensional databases. The system comprises of means for inserting controls (charts, dials, GIS (Geographical Information System), images, icons, commentary box, buttons, color-coded alert buttons, labels, pivot tables, etc.) into the defined frames of the business module(s).

In accordance with another aspect of the present invention, there is provided a method in a computer system for the visualization and navigation of data from relational and/or multidimensional databases. The method comprises of configuring the controls in the different frames. These configurations may include the properties of the controls i.e. defining the query from the data source(s) of the relational and/or multidimensional databases, defining the business rules (mathematical computations) associated to the query, defining the alert and threshold conditions associated to the query, defining the alert method (email alert, SMS [cellular Short Message Service] alert, etc.) once the alert threshold condition is breached, defining the drill action of the control etc. The configuration properties and functions may be different for the different type of controls. Once the controls of a frame are fully configured, it may be referred to as a Dashboard.

In accordance with another aspect of the present invention, there is provided a system for the visualization and navigation of data from relational and/or multidimensional databases. The system comprises of means for configuring the controls in the different frames. These configurations may include the properties of the controls i.e. defining the query from the data source(s) of the relational and/or multidimensional databases, defining the business rules (mathematical computations) associated to the query, defining the alert and threshold conditions associated to the query, defining the alert method (email alert, SMS [cellular Short Message Service] alert, etc.) once the alert threshold condition is breached, defining the drill action of the control etc. The configuration properties and functions may be different for the different type of controls. Once the controls of a frame are fully configured, it may be referred to as a Dashboard.

In accordance with another aspect of the present invention, there is provided a method in a computer system for the visualization and navigation of data from relational and/or multidimensional databases. The method comprises of configuring the drill-actions for any of the controls in the Dashboards for the purpose of multi-path navigations. Each control may be configured with one or more drill-actions (links) to the targeted Dashboard(s) and, optionally, to any other Business Modules, URLs (Uniform Resource Locators), websites or applications, etc. The user may specify the targeted Frame areas or space for these targeted Business Modules or any other URLs (Uniform Resource Locators), websites or applications, etc. to be displayed. After specifying the drill-actions, the module may be 'saved' for the end-user. In the end-user environment, upon mouse click on the control, the specified drill-action will take place. The targeted Dashboard(s) and any other targeted Business Modules, URLs (Uniform Resource Locators), websites or applications, etc. will be displayed in the respective frame areas or space, and related data from relational and/or multidimensional databases will be automatically extracted and displayed on the controls of the targeted Dashboard(s).

In accordance with another aspect of the present invention, there is provided a system for the visualization and navigation of data from relational and/or multidimensional databases. The system comprises of means for configuring the drill-actions for any of the controls in the Dashboards for the purpose of multi-path navigations. Each control may be configured with one or more drill-actions (links) to the targeted Dashboard(s) and, optionally, to any other Business Modules, URLs (Uniform Resource Locators), websites or applications, etc. The user may specify the targeted Frame areas or space for these targeted Business Modules or any other URLs (Uniform Resource Locators), websites or applications, etc. to be displayed. After specifying the drill-actions, the module may be 'saved' for the end-user. In the end-user environment, upon mouse click on the control, the specified drill-action will take place. The targeted Dashboard(s) and any other targeted Business Modules, URLs (Uniform Resource Locators), websites or applications, etc. will be displayed in the respective frame areas or space, and related data from relational and/or multidimensional databases will be automatically extracted and displayed on the controls of the targeted Dashboard(s).

In accordance with another aspect of the present invention, there is provided a method in a computer system for the visualization and navigation of data from relational and/or multidimensional databases. The method comprises of saving the Dashboards and any other links to other Business Modules, URLs (Uniform Resource Locators), websites or applications, etc. in the Business Module for the purpose of navigation and visualization of data from the relational and/or multidimensional databases. The user may edit any of these Dashboards in the future by making changes to the configurations of the controls.

In accordance with another aspect of the present invention, there is provided a system for the visualization and navigation of data from relational and/or multidimensional databases. The system comprises of means for saving the Dashboards and any other links to other Business Modules, URLs (Uniform Resource Locators), websites or applications, etc. in the Business Module for the purpose of navigation and visualization of data from the relational and/or multidimensional databases. The user may edit any of these Dashboards in the future by making changes to the configurations of the controls.

In accordance with another aspect of the present invention, there is provided a method in a computer system for the visualization and navigation of data from relational and/or multidimensional databases. The method comprises of designing and creating different levels of Dashboards within a business module. This provides for the novel method for multi-path and multi-level navigations. In this novel method, controls (charts, dials, GIS (Geographical Information System), images, icons, buttons, color-coded alert buttons, labels) in a Dashboard may be configured with drill actions. These drill actions define the target Dashboard(s) which will be extracted and displayed in the business module. Once the user clicks on the control, a multi-path and multi-level navigation will be activated accordingly to extract and display the target Dashboard(s). And from the target Dashboard(s), controls can again be defined to drill to any other target Dashboard(s). Hence, the user is able to define unlimited multi-path and multi-level navigations to achieve better visualizations.

In accordance with another aspect of the present invention, there is provided a system for the visualization and navigation of data from relational and/or multidimensional databases. The system comprises of means for creating different levels of Dashboards within a business module. This provides for the novel method for multi-path and multi-level navigations. In this novel method, controls (charts, dials, GIS (Geographical Information System), images, icons, buttons, color-coded alert buttons, labels) in a Dashboard may be configured with drill actions. These drill actions define the target Dashboard(s) which will be displayed in the business module. Once the user clicks on the control, a multi-path and multi-level navigation will be activated accordingly to display the target Dashboard(s). And from the target Dashboard(s), controls can again be defined to drill to any other target Dashboard(s). Hence, the user is able to define unlimited multi-path and multi-level navigations to achieve better visualizations.

In accordance with another aspect of the present invention, there is provided a method in a computer system for the visualization and navigation of data from relational and/or multidimensional databases. The method comprises of providing universal 'Back' and 'Forward' buttons for all business modules in association to any the drill actions of Dashboard(s). This eliminates the need for the user to design such features and functions in every Dashboard. This universal 'Back' and 'Forward' button will automatically function as drill backward or drill forward for any drill actions.

In accordance with another aspect of the present invention, there is provided a system for the visualization and navigation of data from relational and/or multidimensional databases. The system comprises of means for providing a universal 'Back' and 'Forward' buttons for all business modules in association to any the drill actions of Dashboard(s). This eliminates the need for the user to design such feature and function in every Dashboard. This universal 'Back' and 'Forward' button will automatically function as drill backward or drill forward for any drill actions.

In accordance with another aspect of the present invention, there is provided a method in a computer system for the visualization and navigation of data from relational and/or multidimensional databases. The method comprises of placing color-coded Alert Button(s) on an image or next to the image to better communicate the meaning of the visualization associated to the image. An image may be a map, process, activity, picture of a person, etc. In addition, the color-coded Alert Button(s) may be placed on a dynamic map generated by a GIS (Geographical Information System) mapping system. This is to provide better communication of information from the GIS with respect to data being displayed from relational and/or multidimensional databases.

The color-coded Alert Button may be 'blinking' and color-coded as green, yellow or red. Green color is typically used to represent 'Good', yellow color used to represent 'Average' and red color used to represent 'No Good', when comparing the actual measurements with a target or standard measurement. This color-coded system facilitates the comprehension of the information being displayed, and easily communicates the meaning, status or overall health of a business in association to the information in the Business Module.

In accordance with another aspect of the present invention, there is provided a system for the visualization and navigation of data from relational and/or multidimensional databases. The method comprises of placing color-coded Alert Button(s) which on an image or next to the image to better communicate the meaning of the visualization associated to the image. An image can be a map, process, activity, picture of a person, etc. The color-coded Alert Button(s) may be placed on a dynamic map generated by a GIS (Geographical Information System) mapping system.

The color-coded Alert Button may be 'blinking' and color-coded as green, yellow or red. Green color is typically used to represent 'Good', yellow color used to represent 'Average' and red color used to represent 'No Good', when comparing the actual measurements with a target or standard measurement. This color-coded system facilitates the comprehension of the information being displayed, and easily communicates the meaning, status or overall health of a business in association to the information in the Business Module.

In accordance with another aspect of the present invention, there is provided a method in a computer system for the visualization and navigation of data from relational and/or multidimensional databases. The method comprises of placing one or more commentary box (annotation) control(s) in a Frame or Dashboard for the purpose of describing or updating actions taken with respect to the information in the Dashboard. This facilitates collaboration and easily communicates the meaning, status or actions taken in association to the information in the Dashboard and overall business module.

In accordance with another aspect of the present invention, there is provided a system for the visualization and navigation of data from relational and/or multidimensional databases. The system comprises of means for placing one or more commentary box (annotation) control(s) in a Frame or Dashboard for the purpose of describing or updating actions taken with respect to the information in the Dashboard. This facilitates collaboration and easily communicates the meaning, status or actions taken in association to the information in the Dashboard and overall business module.

In accordance with another aspect of the present invention, there is provided a method in a computer system for the visualization and navigation of data from relational and/or multidimensional databases. The method comprises of displaying a 'text pop-up window' showing the actual and target values of the control when the user's mouse is over the control. This is especially useful for Dials and Alert Buttons, where there is a need to keep the visualization neat and simple and at the same time, the user is able to display in depth details whenever the need arises.

In accordance with another aspect of the present invention, there is provided a system for the visualization and navigation of data from relational and/or multidimensional databases. The system comprises of means for displaying a 'text pop-up window' showing the actual and target values of the control when the user's mouse is over the control. This is especially useful for Dials and Alert Buttons, where there is a need to keep the visualization neat and simple and at the same time, the user is able to display in depth details whenever the need arises.

In accordance with another aspect of the present invention, there is provided a method in a computer system for the visualization and navigation of data from relational and/or multidimensional databases. The method comprises of allowing new business rules and mathematical calculations to be applied to the charts and the results to be viewed directly in the user mode. The user may Save the new chart formed by the business rules for better analysis of data from the relational and/or multidimensional databases.

The user may perform additional ad-hoc queries to the relational and/or multidimensional databases. The user may Save the new chart from the ad-hoc queries for better analysis of data from the relational and/or multidimensional databases.

The user may 'drag and drop' any of the charts onto another chart within the Dashboard or to another Dashboard. The new chart may display data from both the charts. The user may Save the new chart for better analysis of data from the relational and/or multidimensional databases.

In accordance with another aspect of the present invention, there is provided as system for the visualization and navigation of data from relational and/or multidimensional databases. The system comprises of means for allowing new business rules and mathematical calculations to be applied to the charts and results to be viewed directly in the user mode. The user may Save the new chart formed by the business rules for better analysis of data from the relational and/or multidimensional databases.

The user may perform additional ad-hoc queries to the relational and/or multidimensional databases. The user may Save the new chart from the ad-hoc queries for better analysis of data from the relational and/or multidimensional databases.

The user may 'drag and drop' any of the charts onto another chart within the Dashboard or to another Dashboard. The new chart may display data from both the charts. The user may Save the new chart for better analysis of data from the relational and/or multidimensional databases.

In accordance with another aspect of the present invention, there is provided a method in a computer system for the visualization and navigation of data from relational and/or multidimensional databases. The method comprises of having features like 'drill-down' to analyze the details of the charts by clicking on any of the elements of the chart. After doing so, the user may 'drill-up' by clicking on the icon above the charts provided in the user Run-Time mode.

In the analysis of charts, the user may 'expand and contract chart features' by clicking on the icon above the chart to access more features and functions of the charts.

In accordance with another aspect of the present invention, there is provided a system for the visualization and navigation of data from relational and/or multidimensional databases. The system comprises of having means for providing features like 'drill-down' to analyze the details of the charts by clicking on any of the elements of the chart. After doing so, the user may 'drill-up' by clicking on the icon above the charts provided in the user Run-Time mode.

In the analysis of charts, the user may 'expand and contract chart features' by clicking on the icon above the chart to access more features and functions of the charts.

In accordance with another aspect of the present invention, there is provided a method in a computer system for the visualization and navigation of data from relational and/or multidimensional databases. The method comprises of using a Query Generator with Business Rules capabilities and functions that is provided in the Run-Time, user mode.

In accordance with another aspect of the present invention, there is provided a system for the visualization and navigation of data from relational and/or multidimensional databases. The system comprises of a Query Generator with Business Rules capabilities and functions that is provided in the Run-Time, user mode.

In accordance with another aspect of the present invention, there is provided a method in a computer system for the visualization and navigation of data from relational and/or multidimensional databases. The method comprises of ad-hoc query on relational and/or multidimensional databases using the Query Generator.

After each query, a new chart will pop-up with the results of the query being displayed. The query may be repeated multiple times, resulting in multiple pop-up charts being displayed. The user may proceed to set Business Rules or mathematical calculations to one or more of these charts. The user may 'drag and drop' any of the charts onto another chart and the combined results may be displayed as new chart.

The user may 'drag and drop' any of these charts onto another chart (main chart) within the Dashboard or to another Dashboard. The new chart may display data from both the charts. The user may Save the new chart for better analysis of data from the relational and/or multidimensional databases.

In accordance with another aspect of the present invention, there is provided a system for the visualization and navigation of data from relational and/or multidimensional databases. The system comprises of means for providing ad-hoc query on relational and/or multidimensional databases using the Query Generator.

After each query, a new chart will pop-up with the results of the query being displayed. The query may be repeated multiple times, resulting in multiple pop-up charts being displayed. The user may proceed to set Business Rules or mathematical calculations to one or more of these charts. The user may 'drag and drop' any of the charts onto another chart and the combined results may be displayed as new chart.

The user may 'drag and drop' any of these charts onto another chart (main chart) within the Dashboard or to another Dashboard. The new chart may display data from both the charts. The user may Save the new chart for better analysis of data from the relational and/or multidimensional databases.

In a basic implementation, only a single module needs to be created and saved. In practice, however, it will normally be convenient to create and save two or more modules that relate to different business aspects, such as sales module, finance module, operations module, and the like. In this case, the drill-actions that are defined when creating each module can include links to other modules. This provides a high-level of user-convenience in that a single-click on a control within the navigation of one module can call up another module straight-away. The user is thus saved from having to close the existing module and open up a new module, in order to switch from one module to another.

Advantages of the invention include one or more of the following. The invention is a comprehensive business intelligence tool that allows users to communicate and collaborate in a user-friendly manner. It extends beyond conventional report-based business intelligence applications.

The auto-trigger alerts via email and SMS provide the user with powerful operational business intelligence capabilities. This provides better support to the operations and eliminates the need to constantly check and view data from relational and/or multidimensional databases.

The generation code eliminates the need for manual programming, thus allowing the programmers to concentrate on the business domain rather than the business intelligence tool. Users can easily create their own business modules without any programming. User interfaces can be created quickly and easily to meet the specific business requirements.

The multi-path and multi-level navigation features enables the user to navigate and view data in any angle and thus bring the user closer to data stored in relational and/or multidimensional databases. This exploratory navigation function allows the user to attain a greater level of understanding of the data stored in relational and/or multidimensional databases and thus make better business decisions.

Other aspects and features of the present invention will be readily apparent to those skilled in the art from a review of the following detailed description with accompanying drawings.

BRIEF DESCRIPTION OF THE DRAWINGS

FIG. 1B a simplified block diagram of a method and system that may be utilized to visualize and navigate relational data in accordance with another embodiment of the present invention that is described.

DETAILED DESCRIPTION OF THE PREFERRED EMBODIMENTS

Figure 1A:
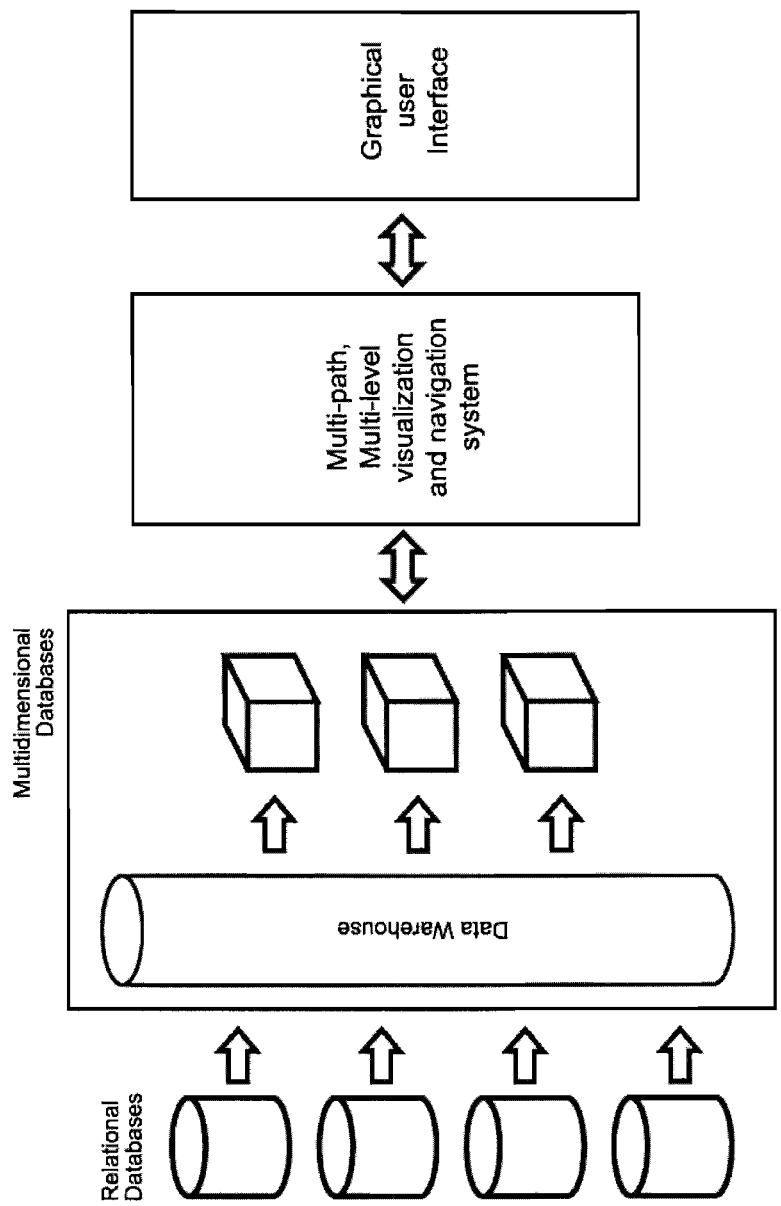
FIG. 1A a simplified block diagram of a method and system that may be utilized to visualize and navigate multidimensional data in accordance with an embodiment of the present invention that is described.

In the following description of the preferred embodiment, reference is made to the accompanying drawings that form a part hereof, and in which is shown by way of illustration specific embodiments in which the invention may be practiced. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims. Thus, the present invention is not intended to be limited to the preferred embodiments shown, but is to be accorded with the broadest scope consistent with the principles and features disclosed herein.

DEFINITIONS

According to the present invention, several items are introduced relating to the fields of relational and/or multidimensional databases and business intelligence, and an understanding of these terms is helpful to fully appreciate the invention.

"Controls" refers to components for the display of information. Examples of Controls are charts, dials, GIS (Geographical Information System), labels, images, commentary box, buttons, alert buttons, pivot tables, etc.

"Frames" refers to the partitions of a computer or other display screen into smaller windows. Frames are used to house controls (charts, labels, images, commentary box, buttons, alert buttons, pivot tables, etc.) and, optionally, contents from other Business Modules, external URLs (Uniform Resource Locators), websites and/or applications. In the case of a Frame housing controls, it may be referred to as a Dashboard once the control(s) in the Frame is/are fully configured with properties such as business rules, control properties and/or links to other Dashboards.

"Dashboard" refers to a Frame containing Controls such as charts, dials, GIS (Geographical Information System), labels, images, commentary box, buttons, alert buttons, pivot tables, etc. and which are linked to external data sources or business rules. In another aspect, a Dashboard is like a presentation slide, except that the information may be linked to data stored in one or more databases.

"Multi-Level Dashboards" refers to the different levels of Dashboards within the business module. This allows the user to specify the 'multi-path' and 'multi-level' drill actions to the target Dashboards within the different levels.

"Business Modules" refers to a collection of Dashboards in multi-level format, and allowing the user to perform multi-path and multi-level navigations. Business module(s) may be used to better display information for the specific business purpose and objectives. It may be Sales Module, Finance Module, Operations Module, etc. or it can be a combination of different business objectives into one single business module.

"Query" refers to a business question from the user that is being translated into terms that can be understood by the relational and/or multidimensional database and the results returned in terms that can be understood by the user.

"Business Rules" refers to mathematical expressions associated to the Query.

"Drill Actions" refers to a set of commands assigned by the user to the Control and specifying the navigation path to display the appropriate Dashboard(s) and any other links to targeted Business Modules, URLs (Uniform Resource Locators), websites or applications, etc. as well as links to other module(s).

"Multi-Path navigation" refers to the different navigational paths taken to reach the targeted Dashboard(s) to be displayed. These paths may be executed simultaneously with a single mouse or keyboard click on the initiating Control on a computer screen. Any particular navigation path may be in a 'drill-up', 'drill-down' or 'drill-sideways' direction with respect to the Dashboard levels.

"Multi-Level navigation" refers to the different navigational levels of Dashboards in a module. These levels may be executed simultaneously with a single mouse or keyboard click on the initiating Control on a computer screen.

"Meta-Data" refers to the structural information about the data stored in relational and/or multidimensional database(s).

"Cubes" refers to relational and/or multidimensional databases where summarized data is arranged in different dimensions for the purpose of relational and/or multidimensional analysis.

"GIS" refers to Geographic Information System(s).

"URL" refers to Uniform Resource Locator.

Overview

A method and system for navigation and visualization of data from relational and/or multidimensional database(s) will now be described. In this system, a developer interactively builds a visualization system, whose building blocks include Dashboards, data sources and resources.

Referring to FIG. 1A, a simplified block diagram of a method and system that may be utilized to visualize and navigate multidimensional data in accordance with an embodiment of the present invention is described.

This block diagram shows that data from relational databases is summarized, mapped and populated to multidimensional databases. In the multidimensional databases, the data is further organized in a multidimensional relationship manner. The data in multidimensional databases can be defined and mapped along multiple dimensions. For example, the data in a sales multidimensional database may include dimensions for the different types of products, locations, customers, sales channels and time dimensions.

The multidimensional database system comprises of two functionalities, namely the multidimensional database server and the multidimensional database itself.

The multidimensional database stores both the structural information (meta-data) about the data and the data itself. The multidimensional database server manages the multidimensional data stored in the multidimensional database. Specifically, the multidimensional database server allows users to define the structure of the multidimensional data, load data into the multidimensional database, and execute the user queries over the data stored in the multidimensional database. Information queried from the multidimensional database server comprises of two areas: meta-data and user data. The meta-data usually describe the structural information such as which multidimensional database, the available data files, business rules (if any), dimensions, levels, drill-down paths, measures, etc. The user data comprises of the actual data stored in the multidimensional database according to the meta-data descriptions or definitions.

The user can interact through the user interface, usually by means of a computer or other display screen by using a mouse, keyboard or any user interface devices. User requests or interactivity are communicated to the visualization and navigation system by the activation of the computer program in this system. These requests or interactivity can take the forms of multi-path and multi-level navigations. Upon the activation of the computer program in the visualization and navigation system, the request is communicated to the multidimensional database system. The multidimensional database system retrieves the requested meta-data and data from the multidimensional database and presents the data to the user through the user interface.

Referring to FIG. 1B, a simplified block diagram of a method and system that may be utilized to visualize and navigate relational data in accordance with another embodiment of the present invention is described.

The relational database stores both the structural information (meta-data) about the data and the data itself. The relational database server manages the relational data stored in the relational database. Specifically, the relational database server allows users to define the structure of the relational data, load data into the relational database, and execute the user queries over the data stored in the relational database. Information queried from the relational database server comprises of two areas: meta-data and user data. The meta-data usually describe the structural information such as which relational database, the available data files and business rules, if any. The user data comprises of the actual data stored in the relational database according to the meta-data descriptions or definitions.

The user can interact through the user interface, usually by means of a computer or other display screen by using a mouse, keyboard or any user interface devices. User requests or interactivity are communicated to the visualization and navigation system by the activation of the computer program in this system. These requests or interactivity can take the forms of multi-path and multi-level navigations. Upon the activation of the computer program in the visualization and navigation system, the request is communicated to the relational database system. The relational database system retrieves the requested meta-data and data from the relational database and presents the data to the user through the user interface.

Figure 2:
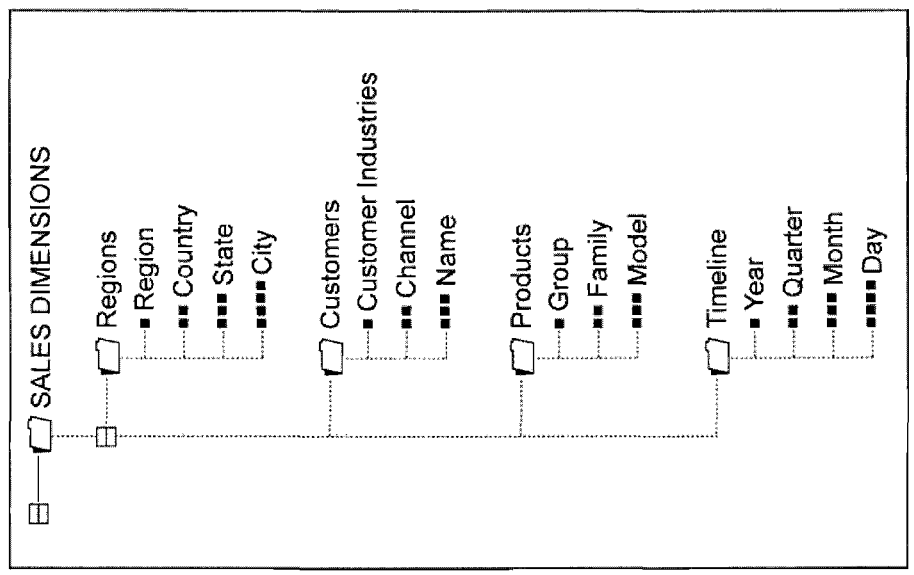
FIG. 2 is a diagram illustrating a typical arrangement of a multidimensional database where summarized data is arranged in different dimensions.

FIG. 2 is a diagram illustrating a typical arrangement of a multidimensional database where summarized data is arranged in different dimensions. In this example, it shows the database structure for four dimensions in a Sales Cube: Regions, Customers, Products and Timeline. This structure allows the user to define multidimensional queries from any of the four dimensions for the purpose of analysis or visualization of data.

Figure 3:
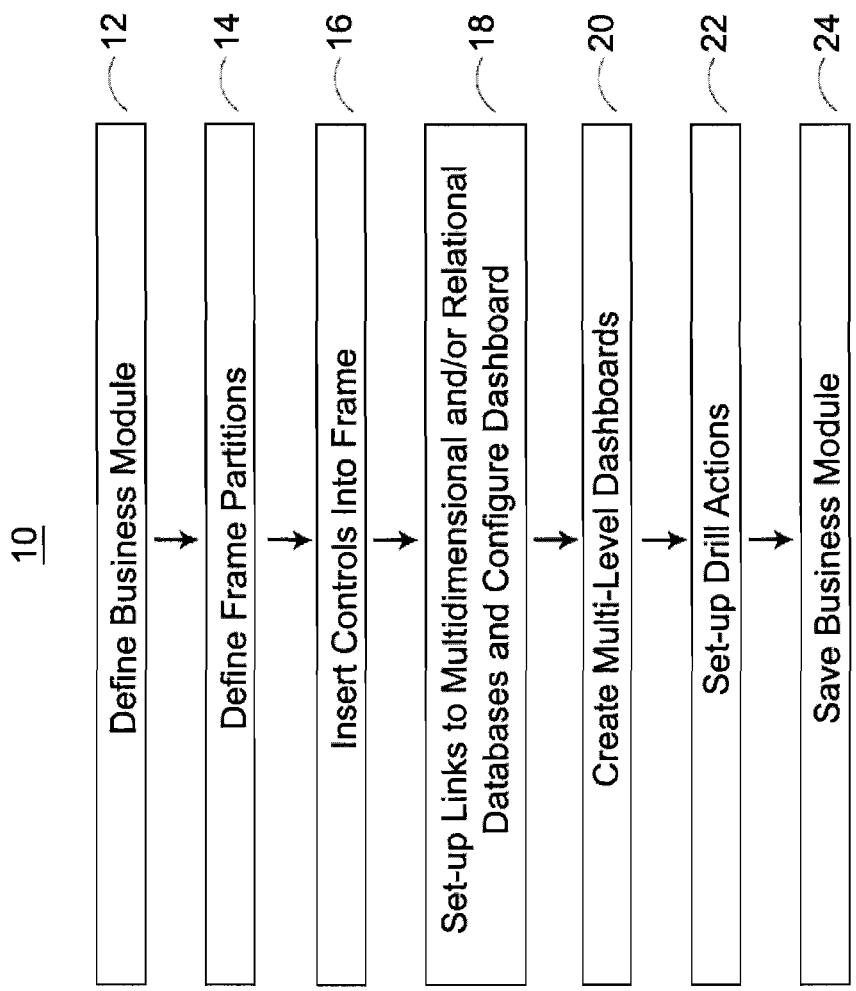
FIG. 3 is a flow illustrating steps performed by a method to construct the Business Module for the navigation and display system according to an embodiment of the invention.

FIG. 3 shows a simplified block diagram 10 of a method and system that may be utilized to design the Business Module for the visualization and navigation of relational and/or multidimensional data in accordance with an embodiment of the present invention that is described.

The method and system comprise of defining business module(s) which may be used to better display information for the specific business purpose and objectives. Business module(s) may be Sales Module, Finance Module, Operations Module, etc. or it can be a combination of different business objectives into one single business module.

The user may start the design of the Business Module 12 by first designing the partitioning the business module(s) as seen on the computer screen into different frames 14. The user has an option to select the different partition layouts from a library of templates available. New partition layouts may be added to the library as and when it becomes necessary. The purpose of these frame partitions 14 is to enable the multi-path and multi-level navigations. The frames are used to house controls 16 (charts, dials, images, icons, commentary box, buttons, color-coded alert buttons, labels, pivot tables, etc.) which may be linked to data source in the form of queries to relational and/or multidimensional databases.

Next, the user may start to insert controls 16 (charts, dials, images, icons, commentary box, buttons, color-coded alert buttons, labels, pivot tables, etc.) into the defined frames of the business module(s).

Now, the user may proceed to configure the controls 16 in the different frames. These configurations may include the properties of the controls, i.e. defining the query from the data source(s) of the relational and/or multidimensional databases, defining the business rules (mathematical computations) associated to the query, defining the alert and threshold conditions associated to the query, defining the alert method (email alert, SMS alert, etc.) once the alert threshold condition is breached, defining the drill action of the control, etc. The configuration properties and functions may be different for the different type of controls. Once the controls of a frame are fully configured, it may be referred to as a Dashboard 18.

The user may now proceed to save the Dashboards 18 in the Business Module for the purpose of navigation and visualization of data from the relational and/or multidimensional databases. The user may edit any of these Dashboards in the future by making changes to the configurations of the controls 16.

In order to achieve multi-path and multi-level navigations, in accordance with the present invention the user may design and create different levels of Dashboards 20 within a business module. This provides for the novel method for multi-path and multi-level navigations. In this novel method, controls (charts, dials, GIS (Geographical Information System), images, icons, buttons, color-coded alert buttons, labels) in a Dashboard may be configured with drill actions 22. These drill actions 22 define the targeted Dashboard(s) and, optionally, any other links to targeted Business Modules, URLs (Uniform Resource Locators), websites or applications, etc. which will be extracted and displayed in the business module. In the Run-Time, user mode, once the user clicks on the control, multi-path and multi-level navigation(s) will be activated accordingly to the defined 'drill actions' to extract and display data from relational and/or multidimensional databases to the targeted Dashboard(s) and to display information from any targeted Business Modules, URLs (Uniform Resource Locators), websites or applications, etc. in the specified Frame area or space. And from the target Dashboard(s), controls can again be defined to drill to any other target Dashboard(s). Hence, the user is able to define unlimited multi-path and multi-level navigations to achieve better visualizations. In practice, of course, some of the controls may define stop points from which no drill action can be made.

In the final step in designing the Business Module, the user saves the entire module 24 in the design mode. The saved Business Module is immediately available in the user mode for the user to view, navigate and display data stored in relational and/or multidimensional databases.

Figure 4:
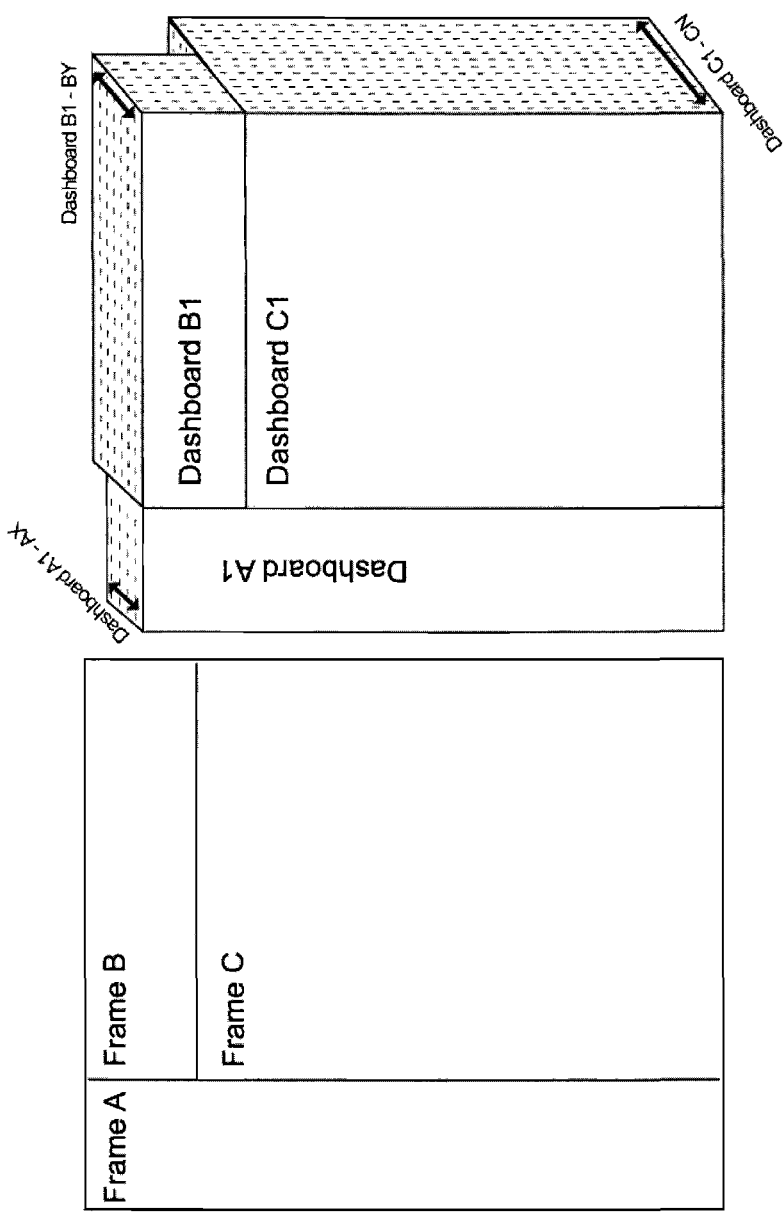
FIG. 4A is a diagram illustrating a typical Frame partition in a Business Module.
FIG. 4B is a diagram illustrating 'multiple level Dashboards' in a Business Module. This provides for 'multi-path' and multi-level' drill actions.

FIG. 4A is a diagram illustrating a typical Frame partition in a Business Module. The user has the option to select the frame layout from the library of predefined Frame partitions or to design their own layouts. In the present embodiment, the frames are non-overlapping on the display screen.

FIG. 4B is a diagram illustrating 'multiple level Dashboards' in a Business Module. This provides for 'multi-path' and multi-level' drill actions. In the given example, there is a total of three separate Frames (Frame A, Frame B and Frame C) in the Business Module. These individual Frames can be constructed and configured to multiple Dashboards. The number of Dashboard levels per Frame is unlimited and is not dependent on its neighboring frame. For example, for Frame A, it can be constructed and configured into Dashboard levels: A1 to AX, where X can be any given number. Similarly, for Frame B, it can be constructed and configured into Dashboard levels: B1 to BY, where Y can be any given number. Similarly, for Frame C, it can be constructed and configured into Dashboard levels: C1 to CN, where N can be any given number.

The user has the flexibility to construct and configure any number of Dashboard levels per Frame for any given Business Modules. In each of the Dashboards, the user can insert any number of Controls to it. Hence, there is an unlimited set of navigation paths, in a multi-path and multi-level manner that can be designed into the system according to the business and operational needs of the users. This provides for the novel method for multi-path and multi-level navigations.

Figure 5:
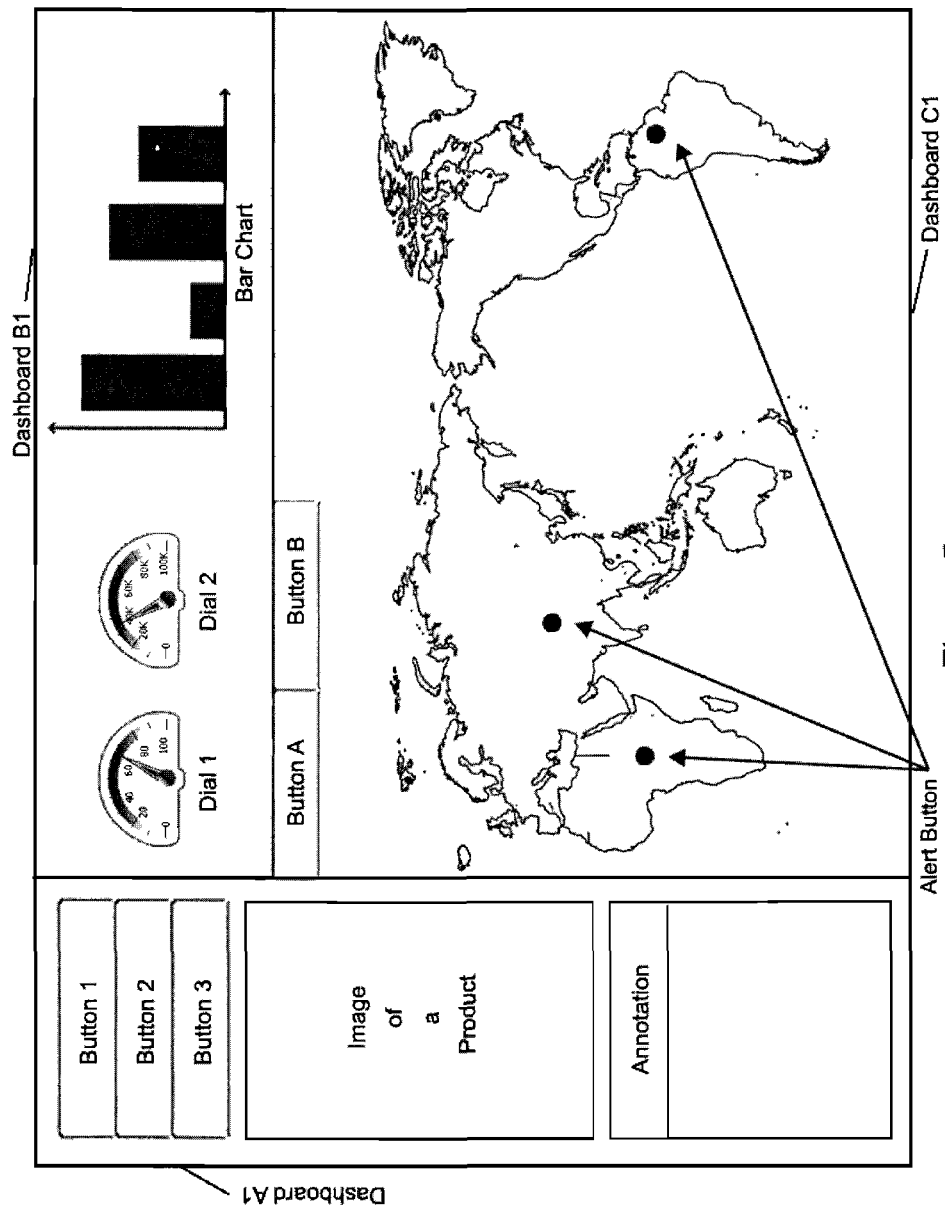
FIG. 5 is a diagram illustrating the Controls that may be inserted to the Frames to form Dashboards in a Business Module.

FIG. 5 is a diagram illustrating the controls that may be inserted to the Frames to form Dashboards in a Business Module. In this example, there is a total of three (3) Frames being illustrated. These three (3) Frames were constructed and configured to Dashboard A1, Dashboard B1, Dashboard C1. This represents the Dashboards in Level one (1) of the Business Module.

The user can continue in a similar manner to construct Dashboard A2, Dashboard B2 and Dashboard C2 for Dashboards in Level 2, and so forth.

In the illustrated example, Dashboard A1 contains controls comprising of three (3) buttons, and image and annotations.

The three (3) buttons in Dashboard A1 can be further defined with drill-actions to extract and display any Dashboard in the Business Module within the space of the given Frame. The drill action may be activated when the user clicks on the button.

The image in Dashboard A1 may be used to depict an association of the information that is being displayed in the Business Module. For example, it may be a picture of a product. In this case, it would mean that the charts, dials and maps in the corresponding Dashboards—Dashboard B1 and Dashboard C1 refer to the measurements of the given product. Hence, the purpose of an image is to maximize the comprehension of the information being displayed. The image may also be further defined with drill-actions to extract and display any Dashboard in the Business Module within the space of the given Frame. Again, the drill action may be activated when the user clicks on the image.

Similar to the purpose of the image, the annotation in Dashboard A1 is used for the purpose of improving the comprehensibility of the information being displayed. Annotations can also be used as a communication tool between the users of the system. It can be used to describe the information that is being displayed or even to record the actions that are to be taken or being taken in regards to the latest information being displayed.

In Dashboard C1, the controls (Alert Buttons) are being superimposed onto another control, a world map or maps generated dynamically from GIS (Geographic Information System). This is done to maximize the visualization of the information being displayed. The Alert Buttons may be 'blinking' and can be used to represent the condition or status (green, yellow or red) of the measurement of the given location in the map versus its target or threshold. The Alert Buttons may also be further defined with drill-actions to extract and display any Dashboard in the Business Module within the space of the given Frame. Again, in the Run-Time, user mode, the drill action may be activated when the user clicks on the Alert Button.

Figure 6:
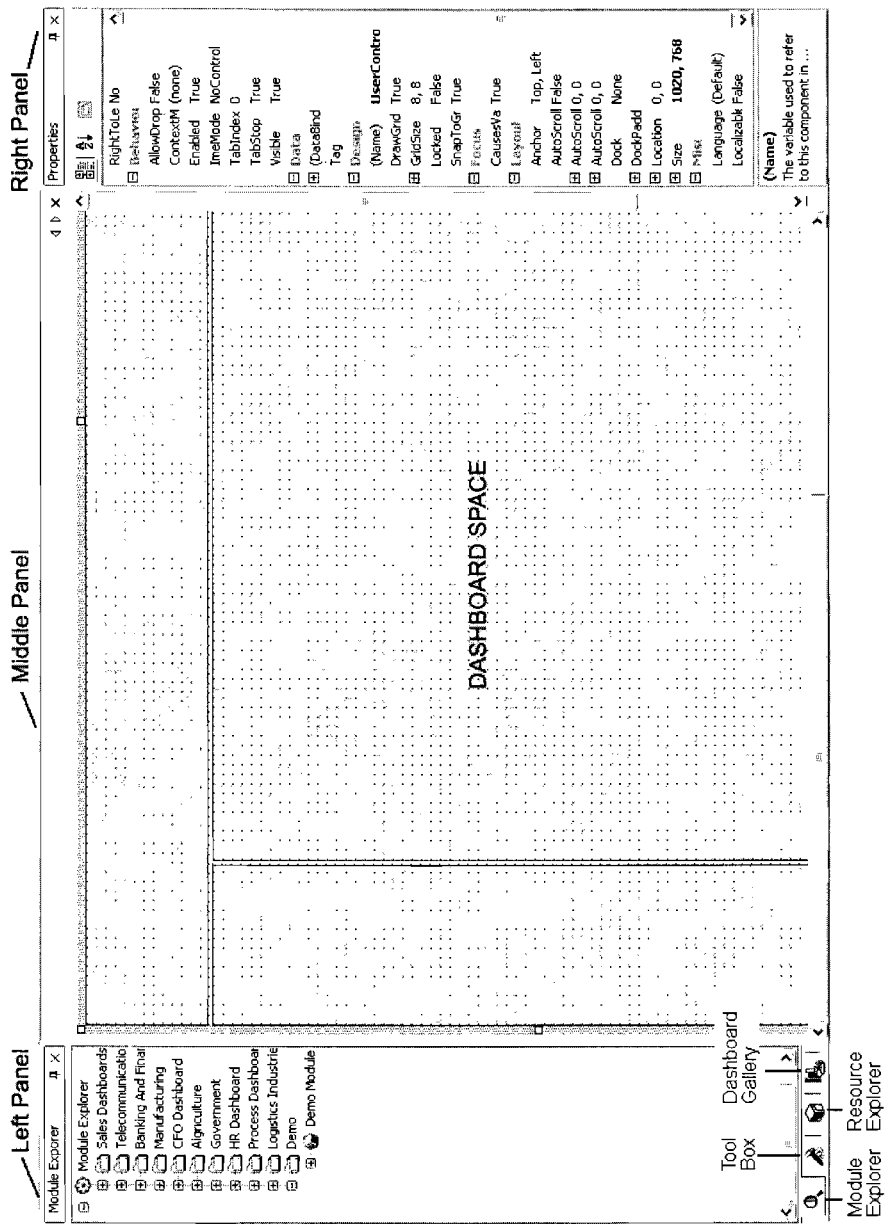
FIG. 6 is a diagram illustrating the overview of the design interface used to design and construct the Business Module. This is the main design interface for designing the system that may be utilized to visualize and navigate relational and/or multidimensional data in accordance with an embodiment of the present invention.

Referring to FIG. 6, this is a diagram illustrating the overview of the design interface used to design and construct the Business Module. This is the main design interface for designing the system that may be utilized to visualize and navigate relational and/or multidimensional data in accordance with the embodiments of the present invention.

The main design interface comprises of Left Panel, Middle Panel and Right Panel.

In the Left Panel, the user may select the four (4) different functions by clicking on the icons at the bottom of the Left Panel. The selected function will appear on the Left Panel for the user to utilize its functionality. The four functions are as follow: Module Explorer, Tool Box, Resource Explorer and Dashboard Gallery.

The Middle Panel comprises of the Dashboard space. This is the working area for inserting Controls to the Frames and configuring the Controls to realize Dashboards.

The Left Panel comprises of the property functions of the Controls. The user may use the property functions to configure Targets and Alerts, E-Mail Alerts, Business Rules configurations, drill-actions, font, color settings for background and text, color-coding, data entry, Frame size, etc.

Figure 7A:
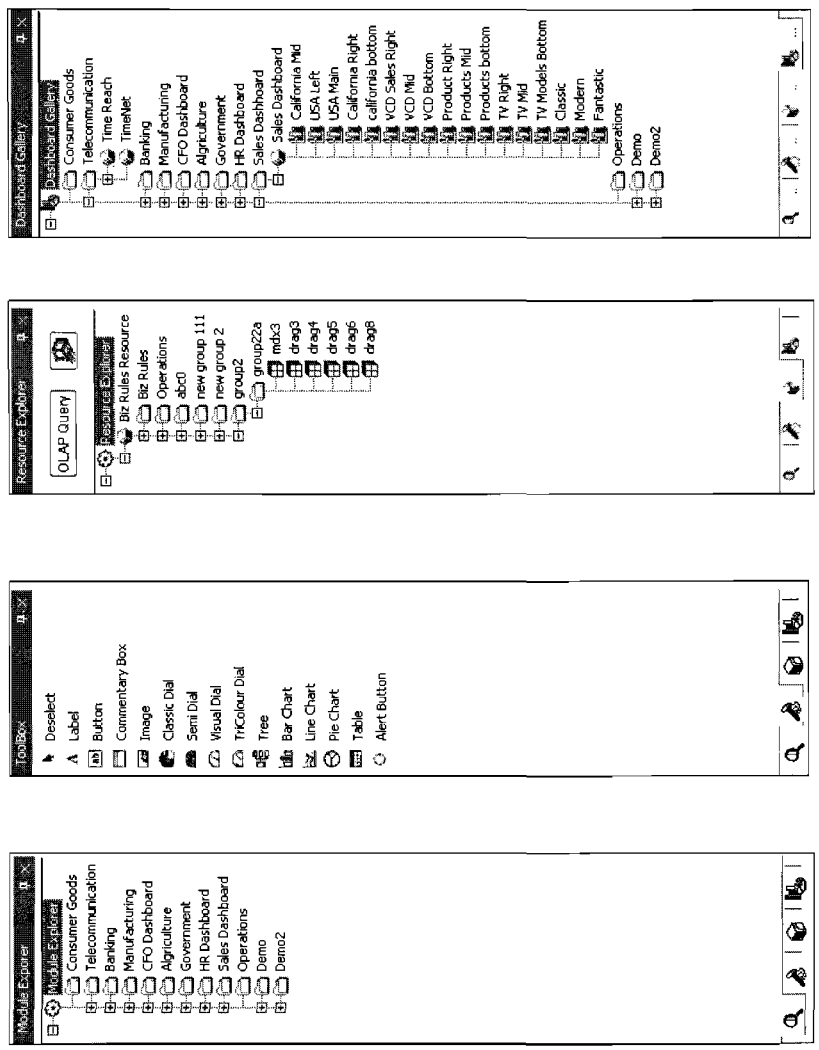
FIG. 7A is a diagram illustrating the different function selections of the designer—Left Panel namely, Module Explorer, Tool Box, Resource Explorer and Dashboard Gallery.

FIG. 7A is a diagram illustrating the different function selections of the designer—Left Panel namely, Module Explorer, Tool Box, Resource Explorer and Dashboard Gallery.

Figure 7B:
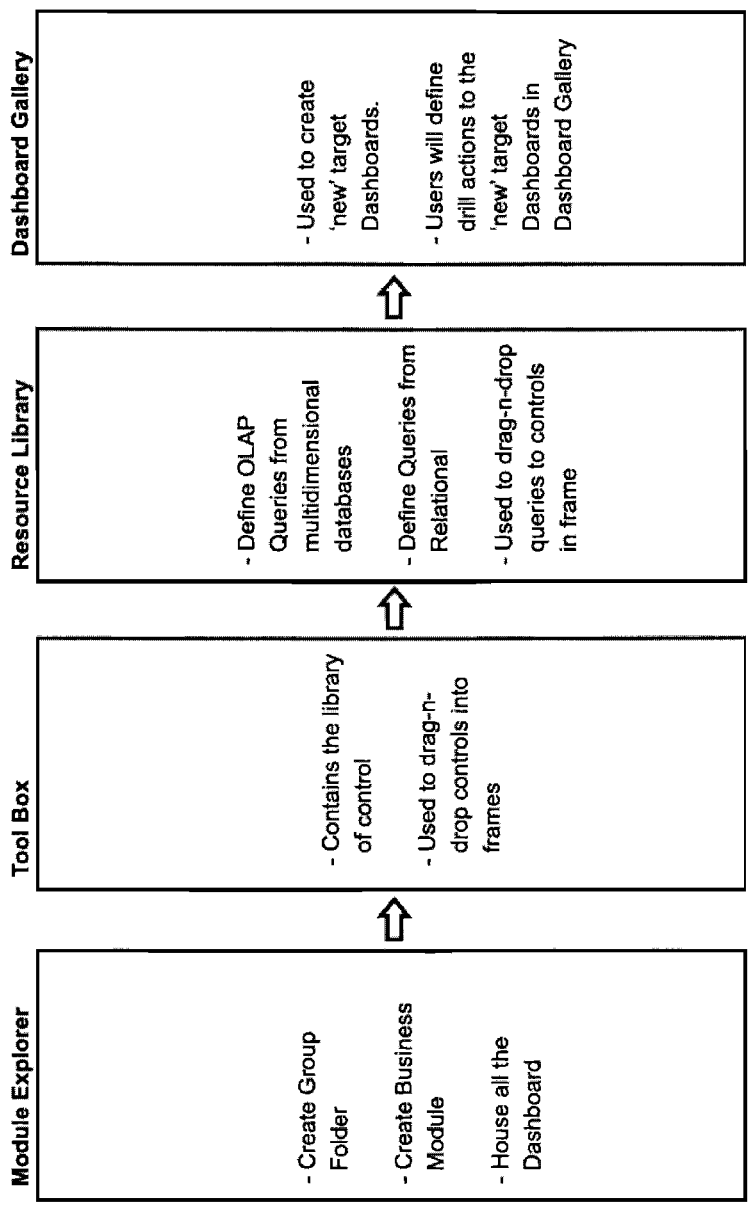
FIG. 7B is a diagram illustrating the typical sequence in selecting the Left Panel functions during the process of designing a Business Module.

FIG. 7B is a diagram illustrating the typical sequence in selecting the Left Panel functions during the process of designing a Business Module.

The Module Explorer may be used to create the Group folders which contain the different Business Modules. It may also be used to create Business Modules. In general, this is the main body of the overall Business Modules as it houses all the Business Modules that were designed in the design mode. It is the backbone of the entire Visualization and Navigation system. Users may access the Module Explorer to search and locate any Dashboards for the purpose of updating or changing the properties of any of the Controls.

The Tool Box contains the libraries of Controls. User can 'drag-n-drop' any of these Controls (dials, alert buttons, charts, tables, buttons, labels, image, commentary box, etc.) to the Frames during the design mode. This provides the user with the capabilities in creating the Visualization of the system.

The main function of the Resource Library is to allow the user to define the relational and/or multidimensional queries for the Controls. After defining the query, the user may 'drag-n-drop' the query into any of the Controls in the Frame.

The Dashboard Gallery serves mainly for the purpose of designing new target Dashboards. All the target Dashboards will remain in the Dashboard Gallery until a drill-action has been defined from the Control to the target Dashboard. When this happens, the target Dashboard will be transferred to one of the Business Module in the Module Explorer.

Figures 8A, 8B:
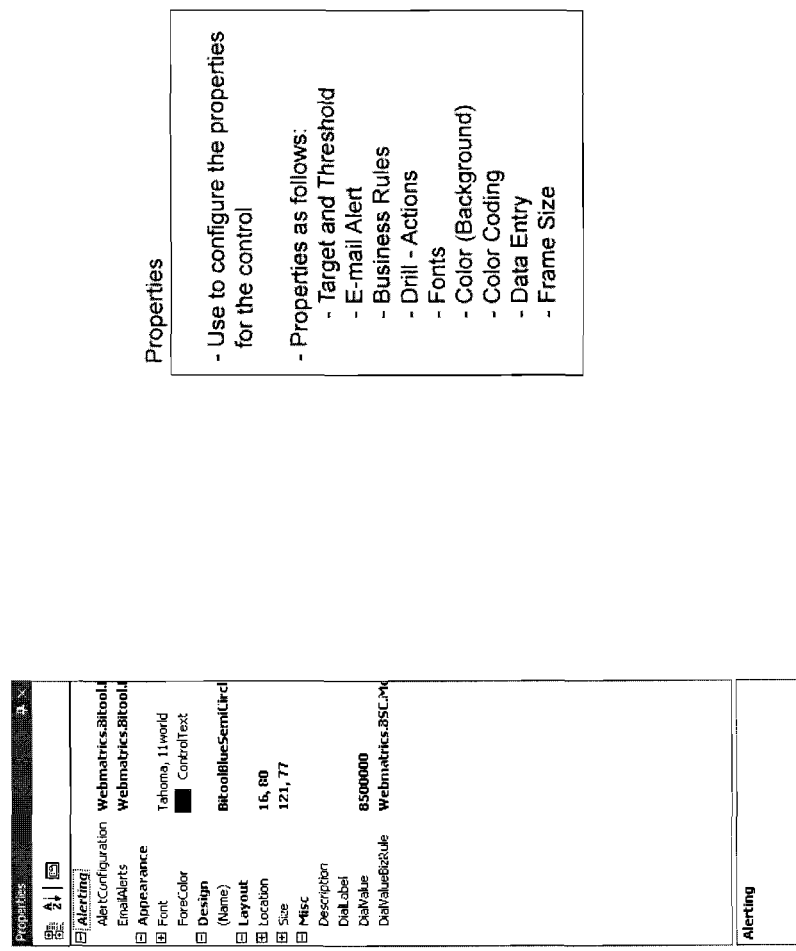
FIG. 8A is a diagram illustrating the different function selections of the designer—Right Panel namely, Properties.
FIG. 8B is a diagram illustrating the different function and configurations of the Properties.

FIG. 8A is a diagram illustrating the different function selections of the designer—Right Panel namely, Properties.

FIG. 8B is a diagram illustrating the different function and configurations of the Properties.

The main function of the Property is to allow the user to configure and customize Controls in the Frame, before it is saved to become a Dashboard. The Property may consist of the following configurations: Targets and Alerts, E-Mail Alerts, Business Rules configurations, drill-actions, font, color settings for background and text, color-coding, data entry, Frame size, etc.

Figure 9:
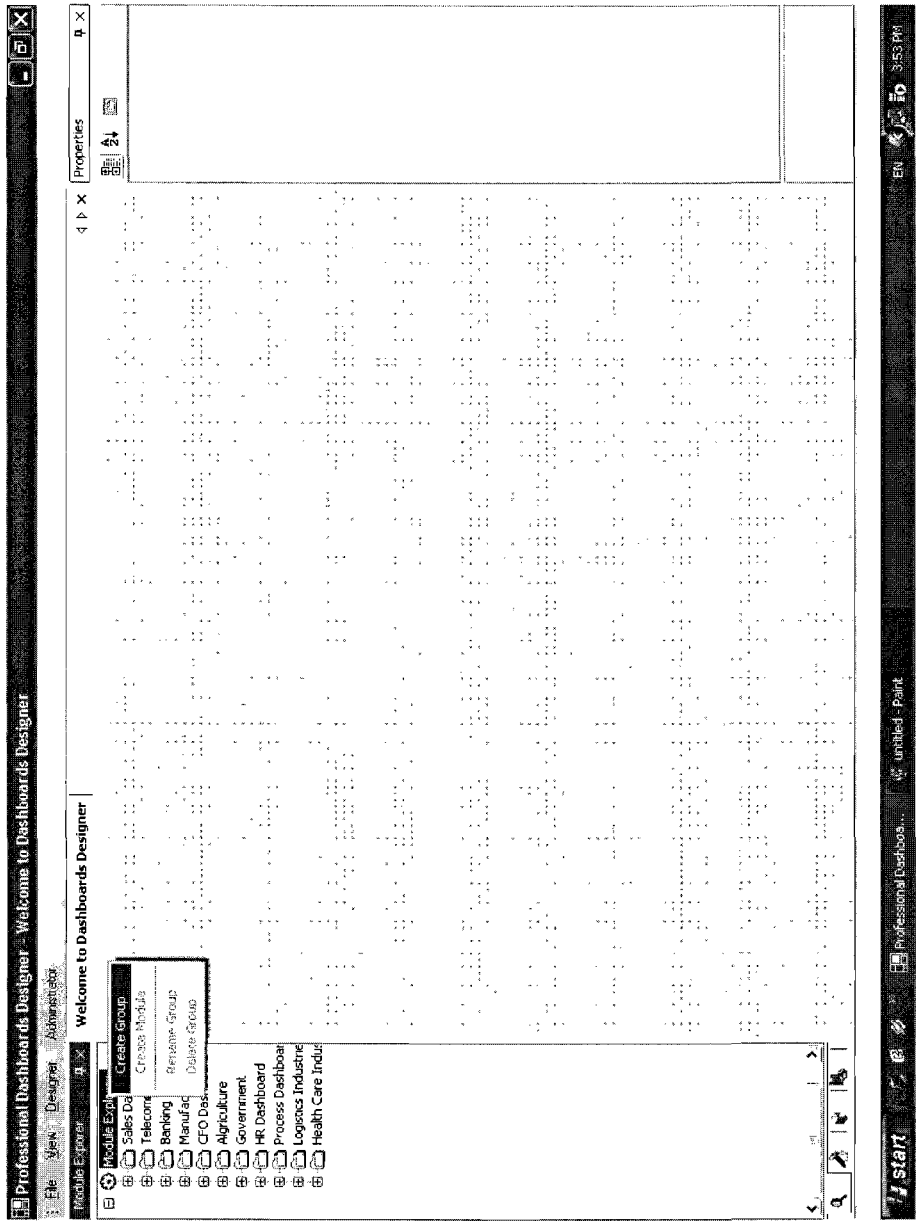
FIG. 9 is a diagram illustrating the initial set-up of a new group in the Module Explorer.

Referring to FIG. 9, this is a diagram illustrating the initial set-up of a new group in the Module Explorer. The Module Explorer is the main system that may be utilized to visualize and navigate relational and/or multidimensional data in accordance with an embodiment of the present invention. It consists of all the Business Modules and grouped under different folders. In order to create a New Group in the Module Explorer, the user may use a mouse having a right button and a left button (not shown) or any other computer selecting device, selects the Module Explorer node with the pointer, and in the case of using the mouse, right clicks on the Module Explorer node to select the 'Create Group' function.

Figure 10:
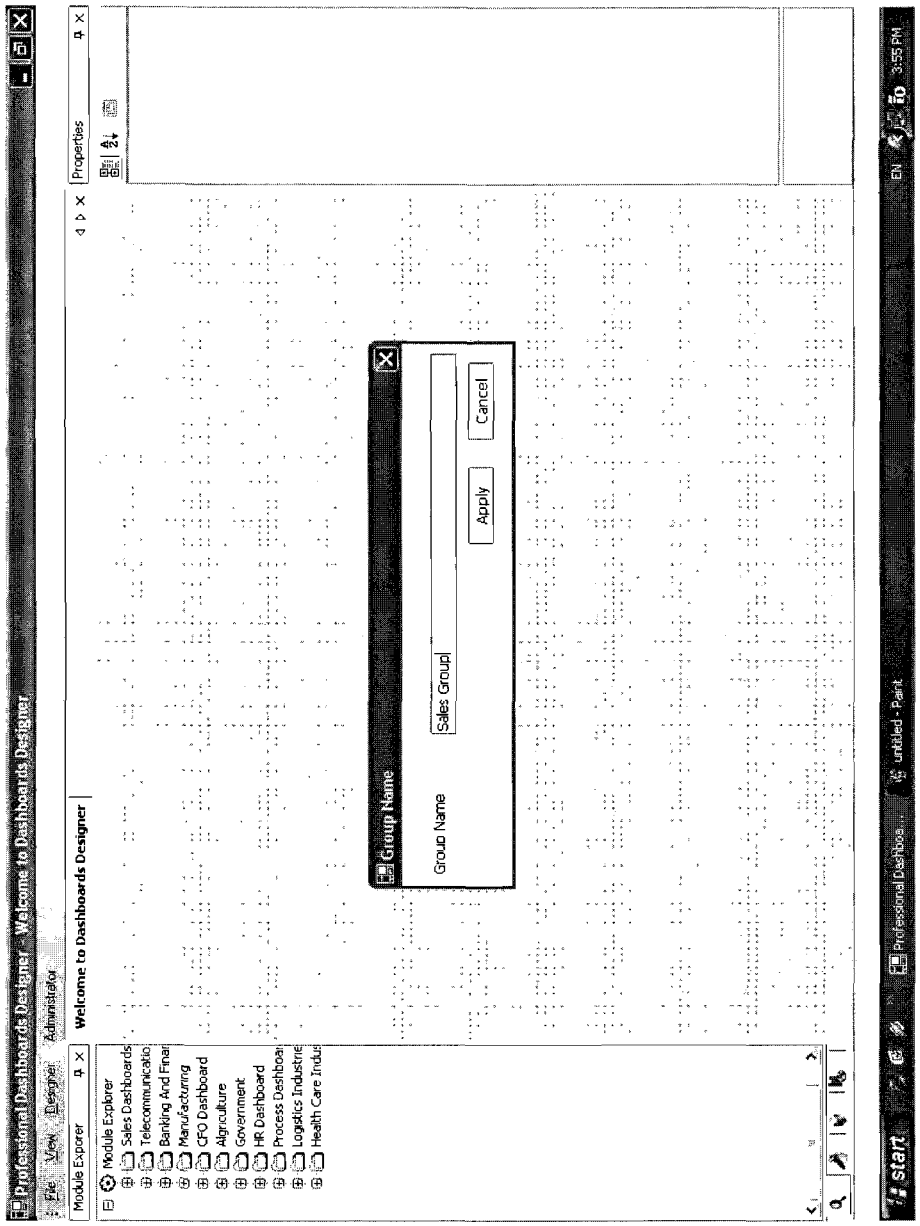
FIG. 10 is a diagram illustrating the naming a new group in the Module Explorer.

FIG. 10 is a diagram illustrating the naming of a new group in the Module Explorer. After right clicking on the Module Explorer node, and selecting the 'Create Group' function, a pop-up window shows up for the user to enter the New Group name.

Figure 11:
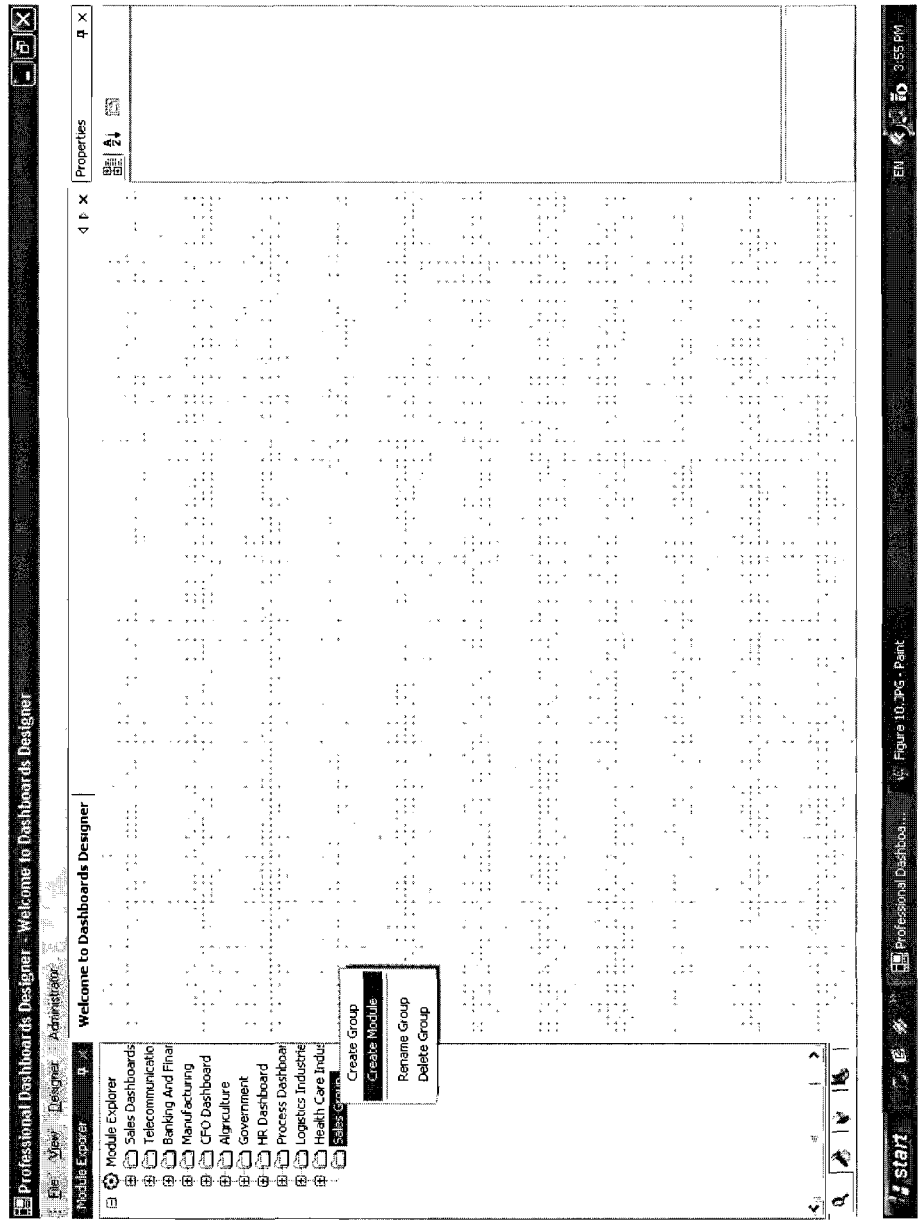
FIG. 11 is a diagram illustrating the initial set-up of a new Business Module under the newly created module group.

FIG. 11 is a diagram illustrating the initial set-up of a new Business Module under the newly-created module group. In order to create a new Business Module in the Module Explorer, the user may use a mouse having a right button and a left button (not shown) or any other computer selecting device, selects the Group folder node with the pointer, and in the case of using the mouse, right clicks on the Group folder node to select the 'Create Module' function.

Figure 12:
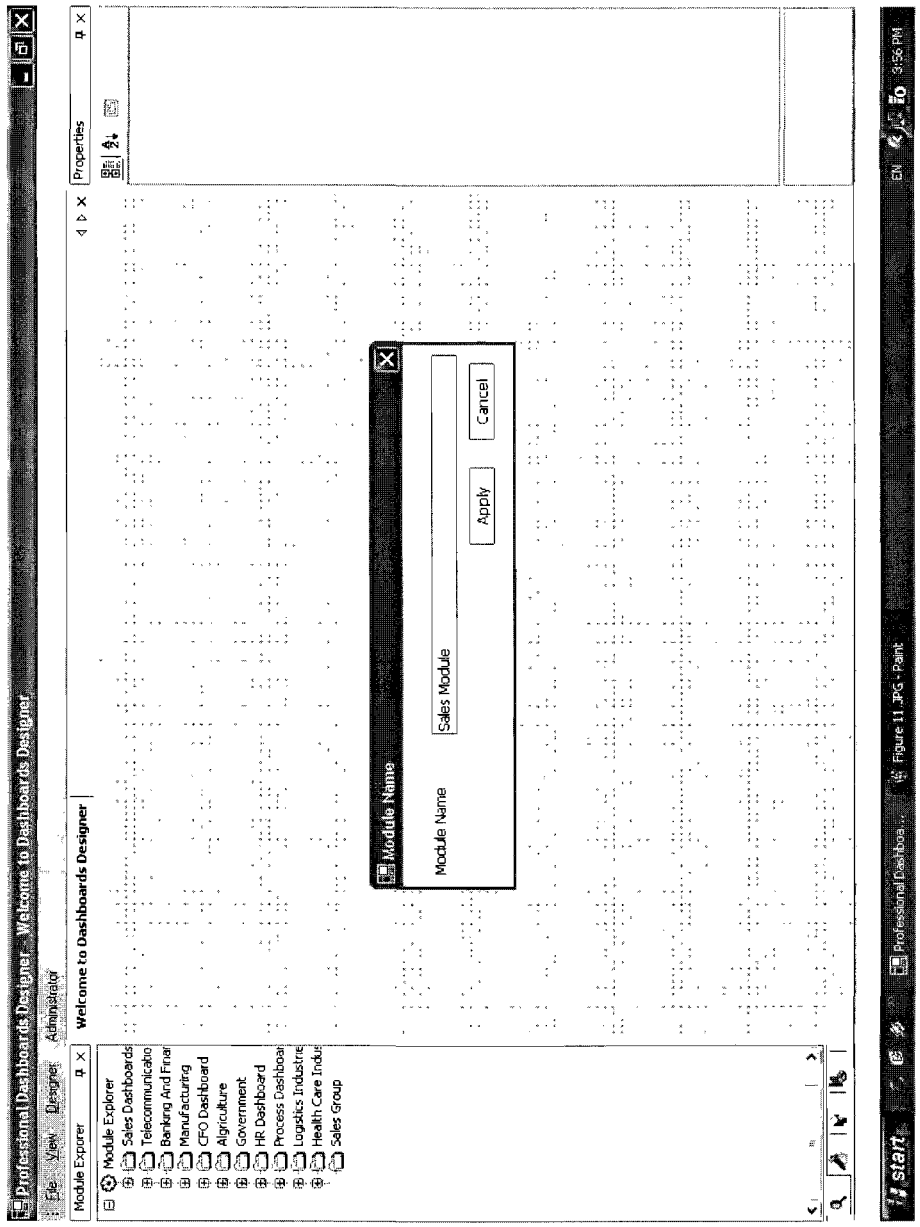
FIG. 12 is a diagram illustrating the naming a new Business Module under the newly created module group.

FIG. 12 is a diagram illustrating the naming of a new Business Module in the Module Explorer. After right clicking on the Group folder, and selecting the 'Create Module' function, a pop-up window shows up for the user to enter the New Module name.

Figure 13:
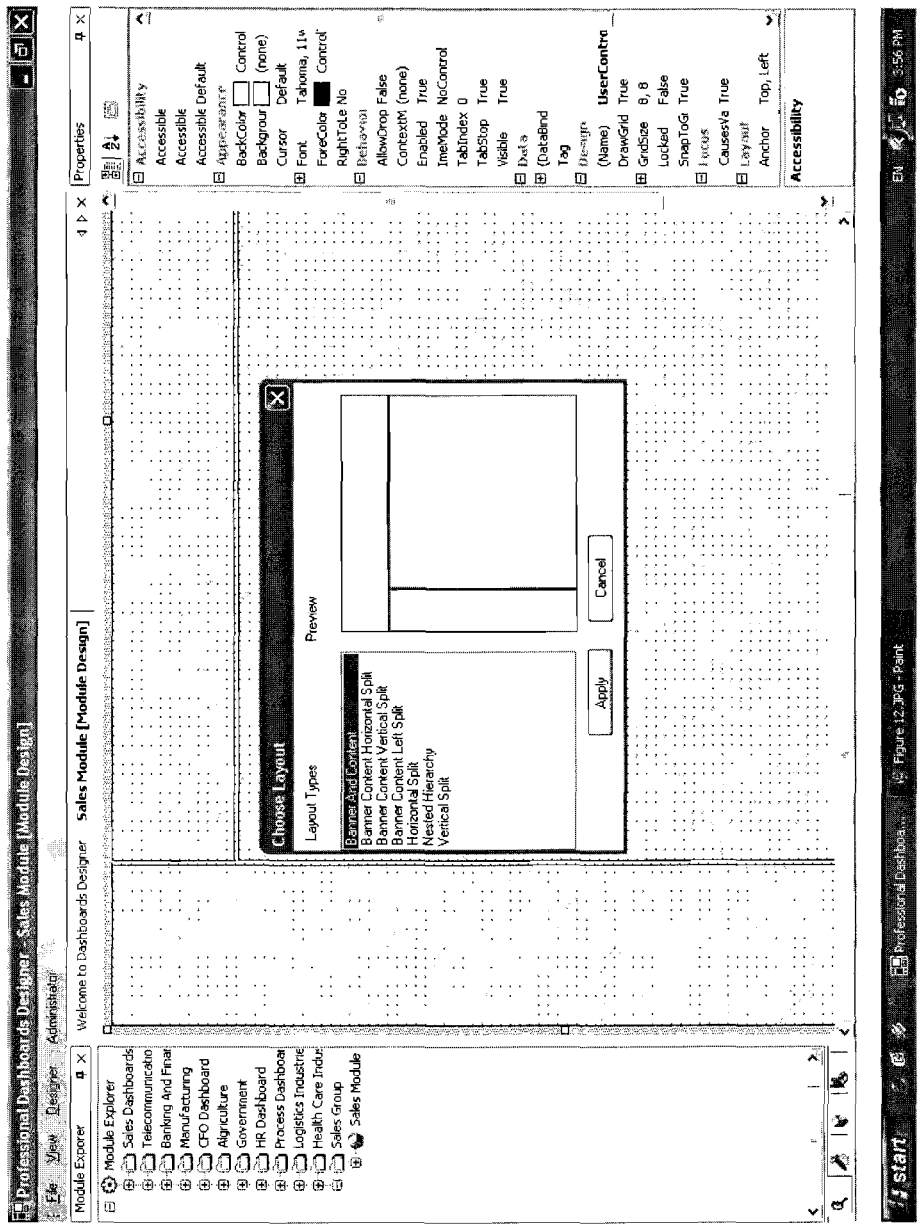
FIG. 13 is a diagram illustrating the selection of a predefined Frame partition layout template for the new Business Module that is being designed.

FIG. 13 is a diagram illustrating the selection of a pre-defined Frame partition layout template for the new Business Module that is being designed. The user has an option to select from the library of templates or design any new layout according to the requirements.

Figure 14:
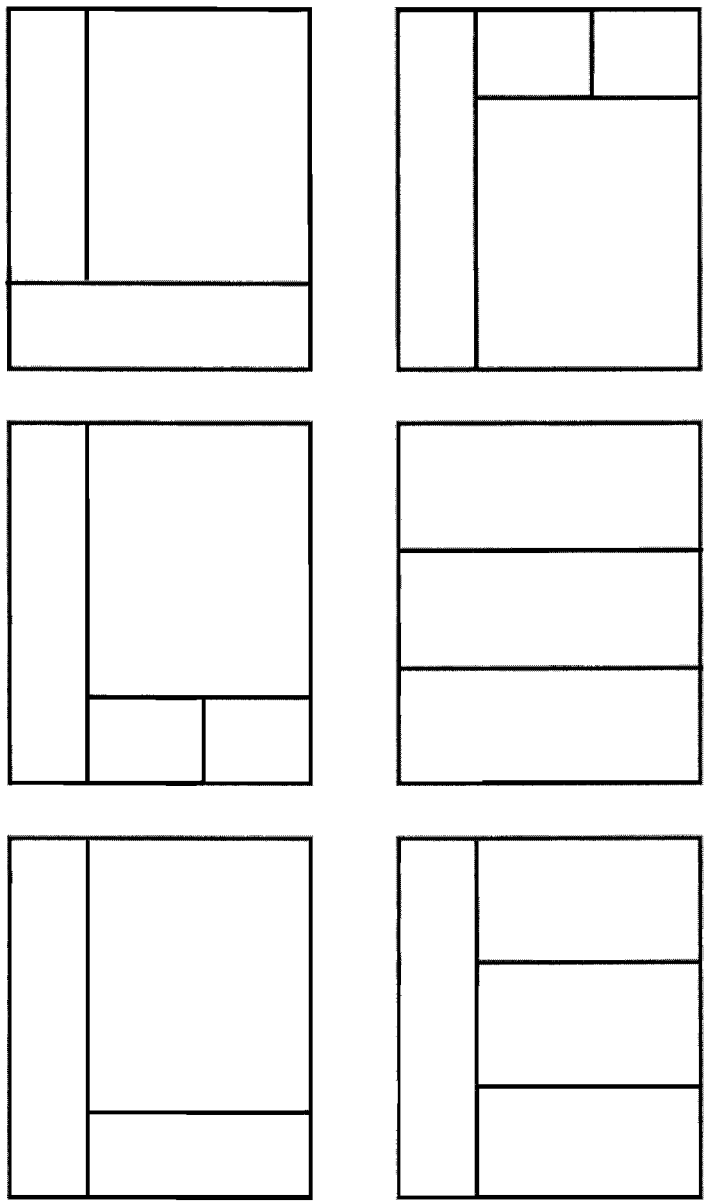
FIG. 14 is a diagram illustrating examples of the predefined Frame partitions and layouts. This is only an example of the layouts and partitions available and the actual method and system is not limited by the examples being illustrated.

FIG. 14 is a diagram illustrating examples of the pre-defined Frame partitions and layouts. This is only an example of the layouts and partitions available and the actual method and system is not limited by the examples being illustrated. The user can choose from any of the Frame partition layouts in designing a new Business Module.

Figure 15:
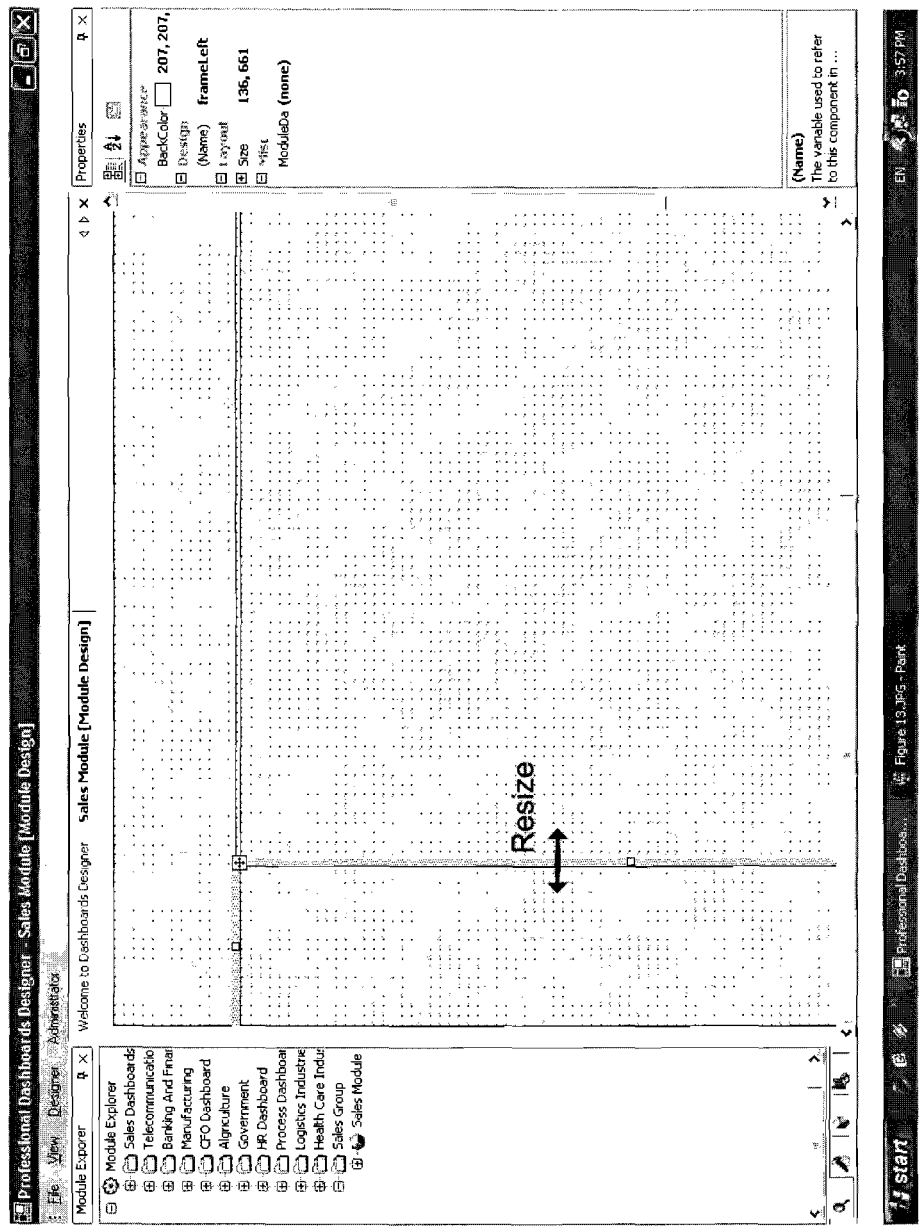
FIG. 15 is a diagram illustrating the re-sizing of the Frames in a business module.

FIG. 15 is a diagram illustrating the re-sizing of the Frames in a Business Module. The user selects the frame to be re-sized by clicking on an area of the frame by using a mouse or any other selection device of the computer. After doing this, the user can either drag the edge of the frame to make the frame smaller or bigger to re-size the Frame. The user may also choose to re-size the Frame by entering the new size for the selected frame directly to the property box configurations at the left panel.

If the size of the module is larger than the space allocated for display in the computer monitor, scroll bar(s) may automatically appear on the bottom and/or right edge of the Frame(s) to facilitate the user in viewing the information being displayed.

Figure 16:
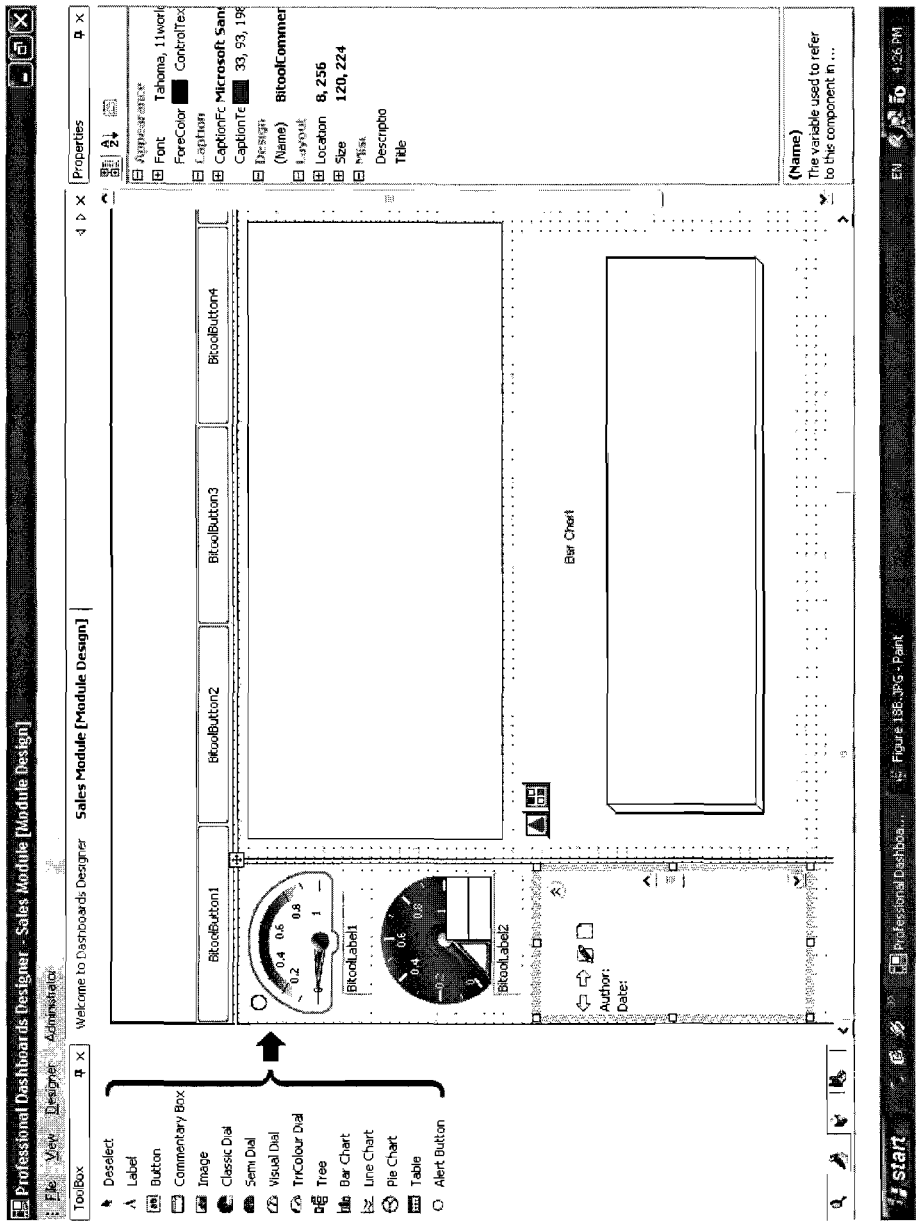
FIG. 16 is a diagram illustrating the insertion of controls to the Frames from the Tool Box.

FIG. 16 is a diagram illustrating the insertion of controls to the Frames from the Tool Box. In order to do this, the user first selects the Tool Box function in the Left Panel by clicking at the corresponding icon at the bottom of the Left Panel.

Once the Tool Box function is selected, it shows up as the Left Panel. The previous Left Panel will disappear and will be replaced by the new selection—Tool Box. Now, the user may proceed to 'drag-n-drop' the Controls from the Tool Box into the respective Frames.

Figure 17:
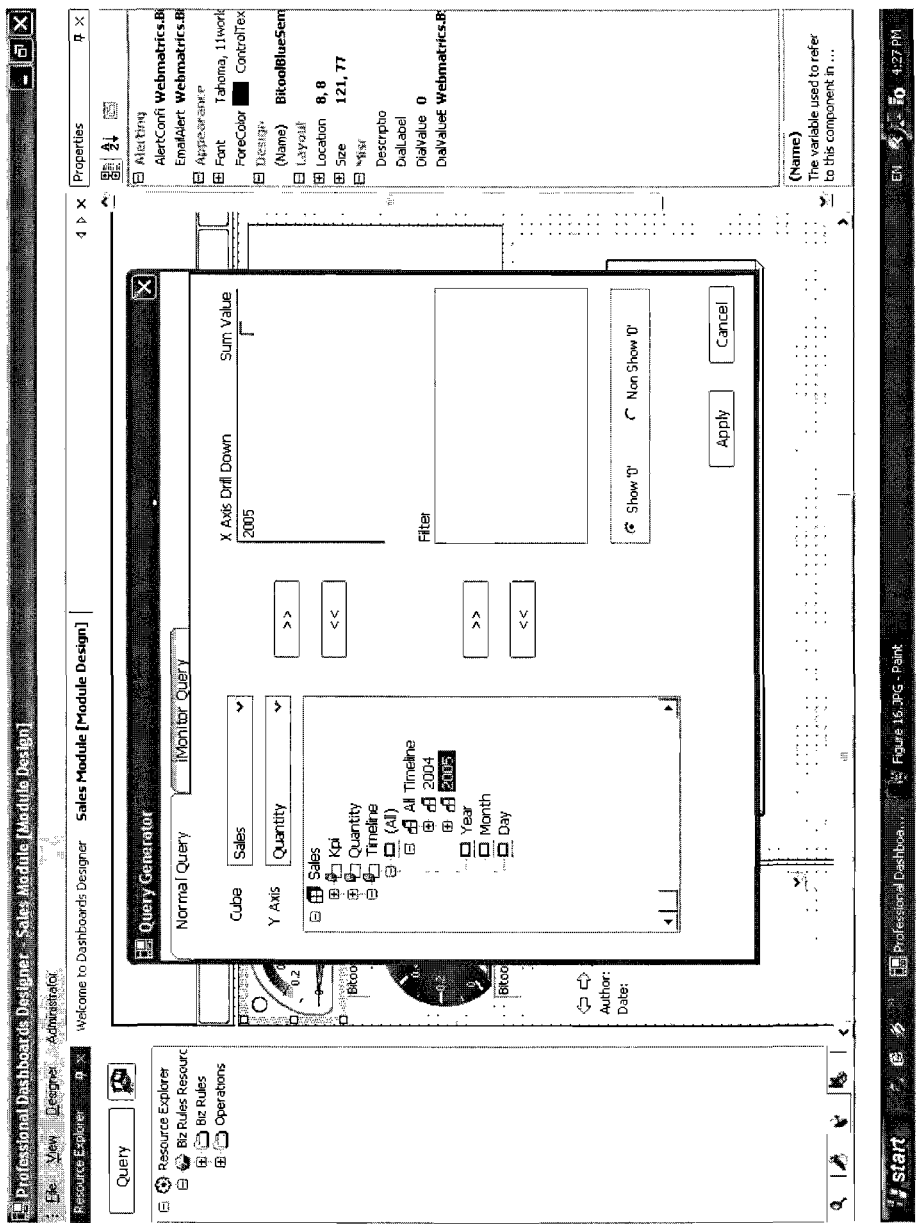
FIG. 17A is a diagram illustrating the configuration and definition of the Query to the relational and/or multidimensional databases.
FIG. 17B is a diagram illustrating the linking of Query from relational and/or multidimensional databases to a control—by dragging the Query icon and dropping it to the control.
Figure 17:
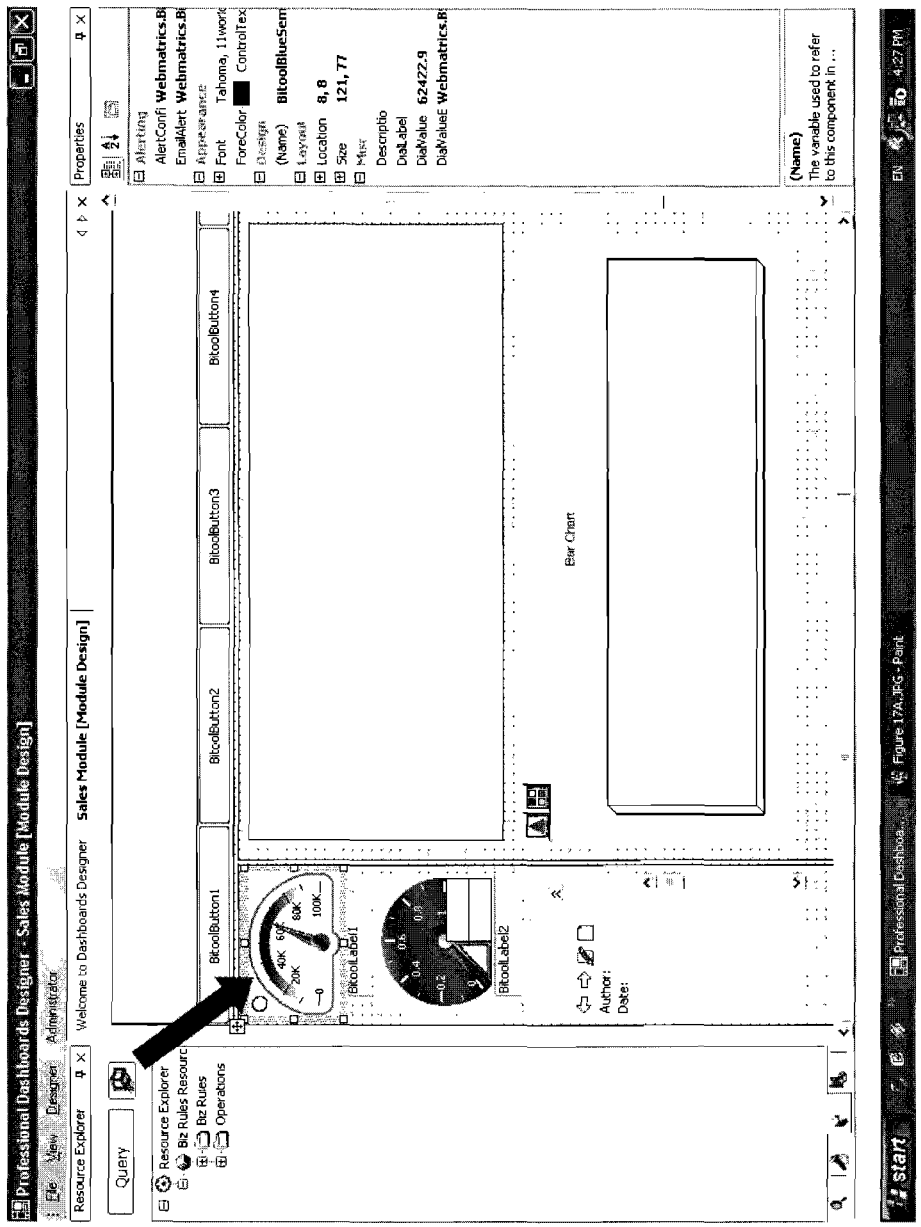

FIG. 17A is a diagram illustrating the configuration and definition of the Query to the relational and/or multidimensional databases. In order to do this, the user first selects the Resource Explorer function in the Left Panel by clicking at the corresponding icon at the bottom of the Left Panel.

Once the Resource Explorer function is selected, it shows up as the Left Panel. The previous Left Panel will disappear and will be replaced by the new selection—Resource Explorer. Now, the user may proceed to define the relational and/or multidimensional query.

FIG. 17B is a diagram illustrating the linking of Query from relational and/or multidimensional databases to a control—by dragging the Query icon and dropping it to the control. Once the relational and/or multidimensional query has been defined as per the method illustrated in FIG. 17A, the user may drag-n-drop this query to the target Control in the Frame.

The steps in FIG. 17A and FIG. 17B are repeated for every Control which is to be linked to the relational and/or multidimensional database. After the steps in FIG. 17A and FIG. 17B, the user may proceed to configure the Controls in the Frames with the respective configurations in the Property function.

Figure 18:
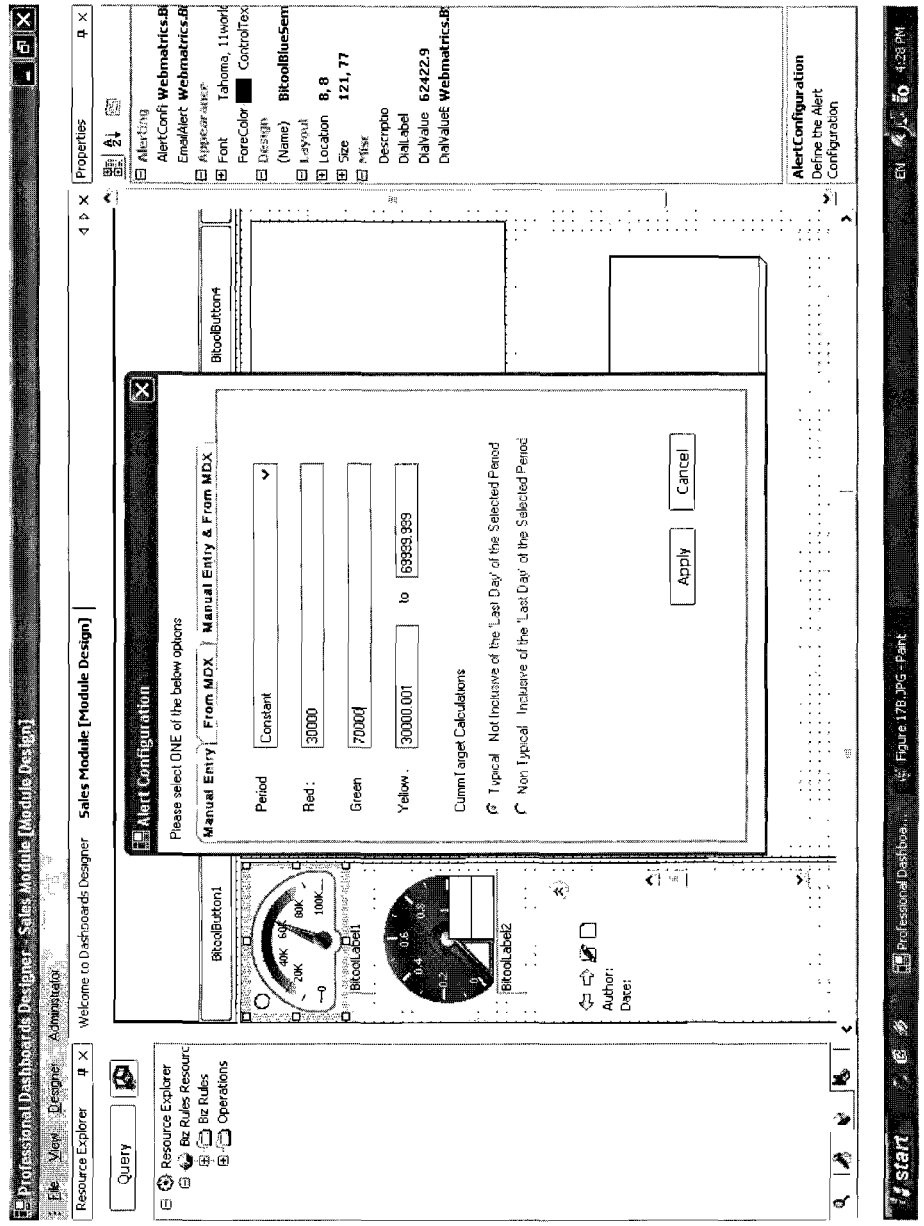
FIG. 18A is a diagram illustrating one of the Properties function—the setting of the alert thresholds for the control.
FIG. 18B is a diagram illustrating another one of the Properties functions—the setting of email alert.
FIG. 18C is a diagram illustrating another one of the Properties functions—the setting of font types, size, etc.
Figure 18:
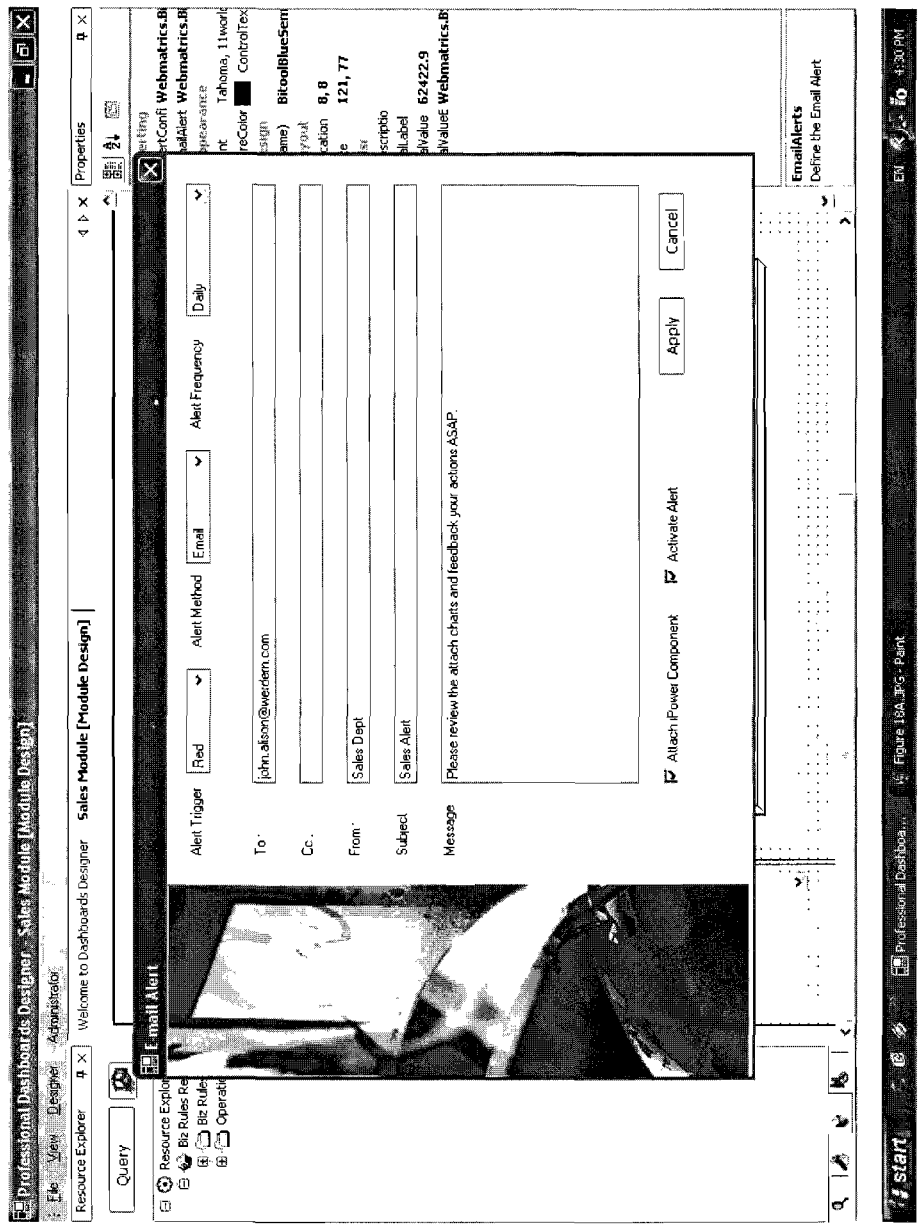
Figure 18:
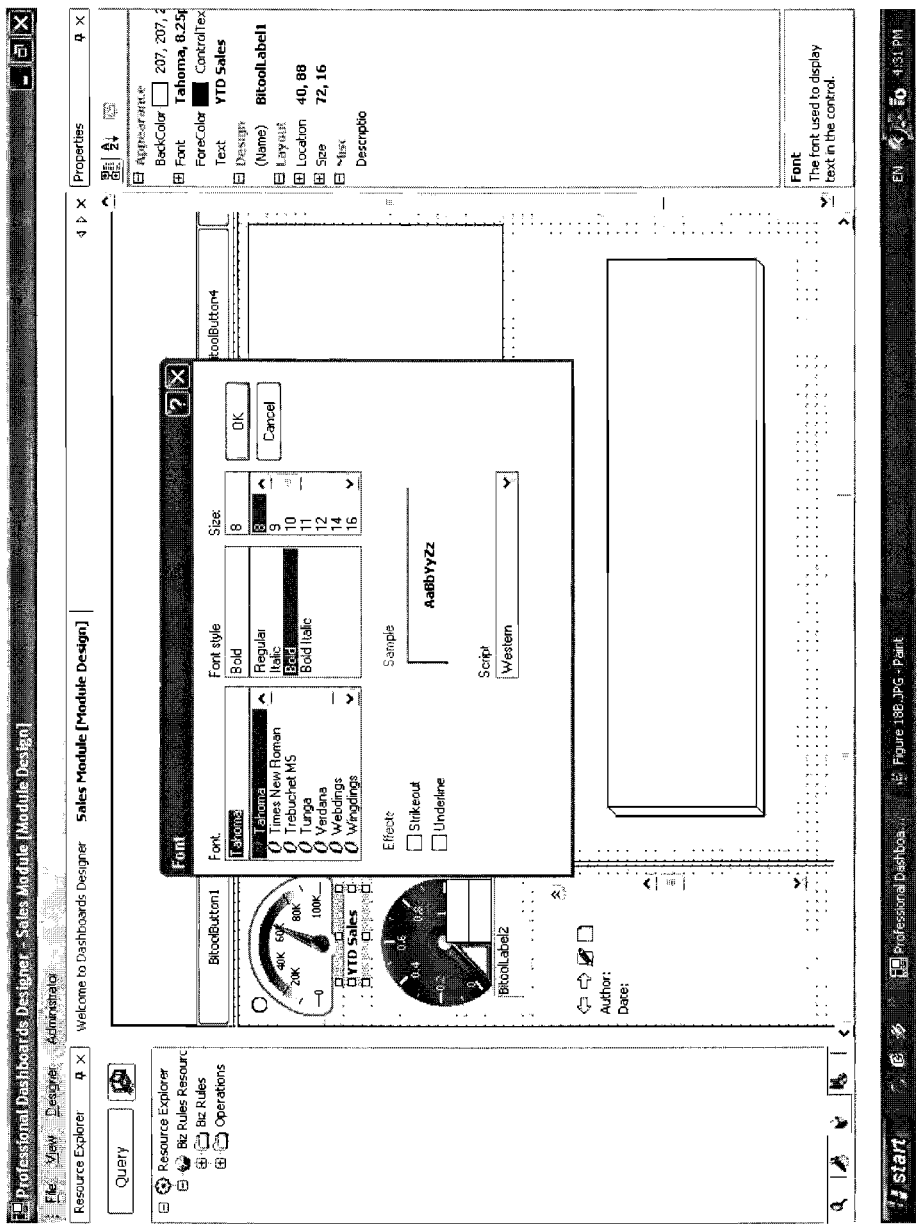

FIG. 18A is a diagram illustrating one of the Properties functions—the setting of the alert thresholds for the control. In order to do this, the user first selects the Control in the Frame by clicking on the Control. The user may proceed to select the Alert Configuration function in the Property function (located at the Right Panel) by clicking at the corresponding description depicted in the Property menu.

Once the Alert Configuration function is selected, a 'pop-up' window shows up. Now, the user may proceed to enter the details in the 'pop-up' window and click on the 'Apply' button to apply the configuration to the Control.

FIG. 18B is a diagram illustrating another one of the Properties functions—the setting of email alert. In order to do this, the user first selects the Control in the Frame by clicking on the Control. The user may proceed to select the E-Mail Alert function in the Property function (located at the Right Panel) by clicking at the corresponding description depicted in the Property menu.

Once the E-Mail Alert function is selected, a 'pop-up' window shows up. Now, the user may proceed to enter the details in the 'pop-up' window and click on the 'Apply' button to apply the configuration to the Control.

FIG. 18C is a diagram illustrating another one of the Properties functions—the setting of font types, size etc. In order to do this, the user first selects the Control in the Frame by clicking on the Control. The user may proceed to select the Font function in the Property function (located at the Right Panel) by clicking at the corresponding description depicted on the Property menu.

Once the Font function is selected, a 'pop-up' window shows up. Now, the user may proceed to enter the details in the 'pop-up' window and click on the 'Apply' button to apply the configuration to the Control.

Figure 19:
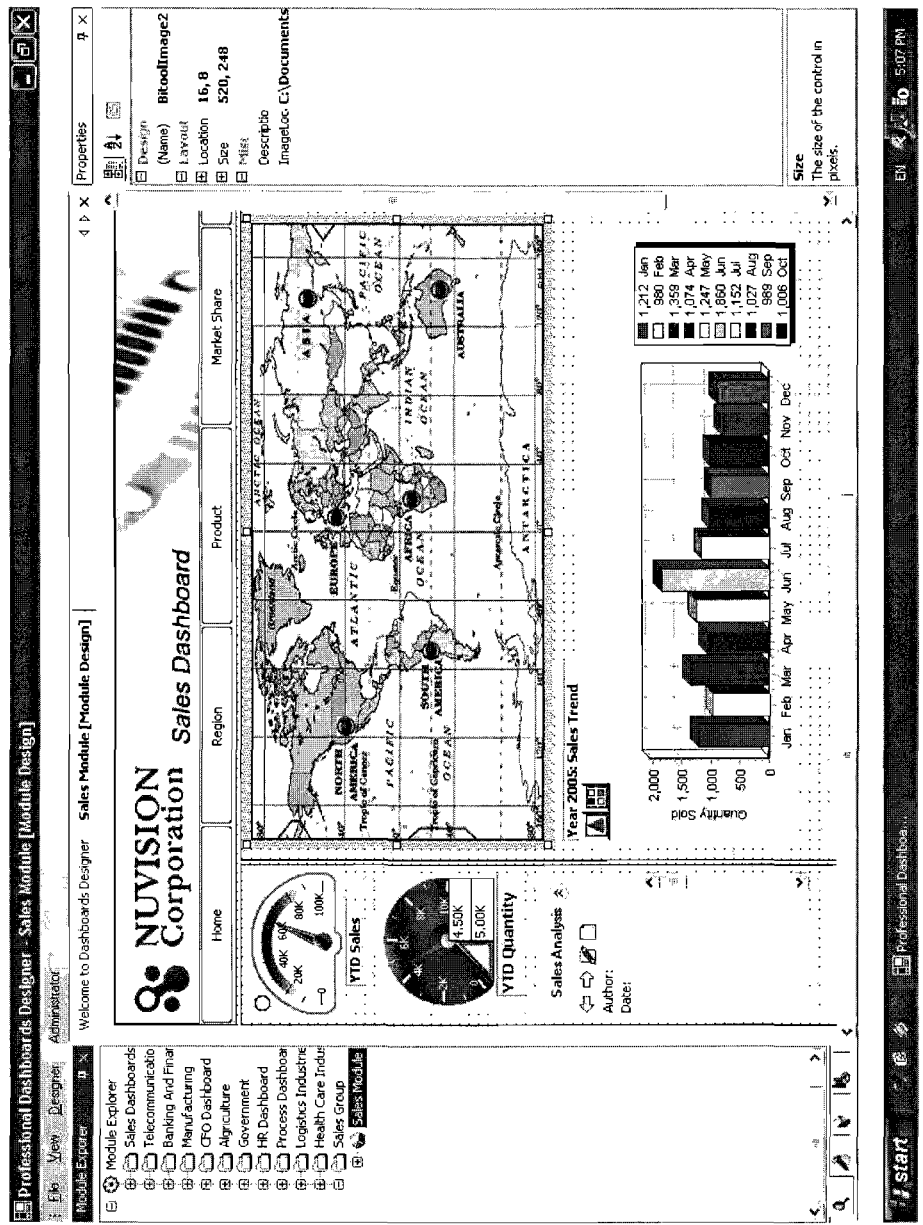
FIG. 19 is a diagram illustrating an example of a completed first level of a business module comprising of three (3) Dashboards.

FIG. 19 is a diagram illustrating an example of a completed first level of a Business Module comprising of three (3) Dashboards. All the Dashboards are fully configured with the properties accordingly. This is the result of steps being carried out according to the flow described in FIG. 11 to FIG. 18C above.

Figure 20:
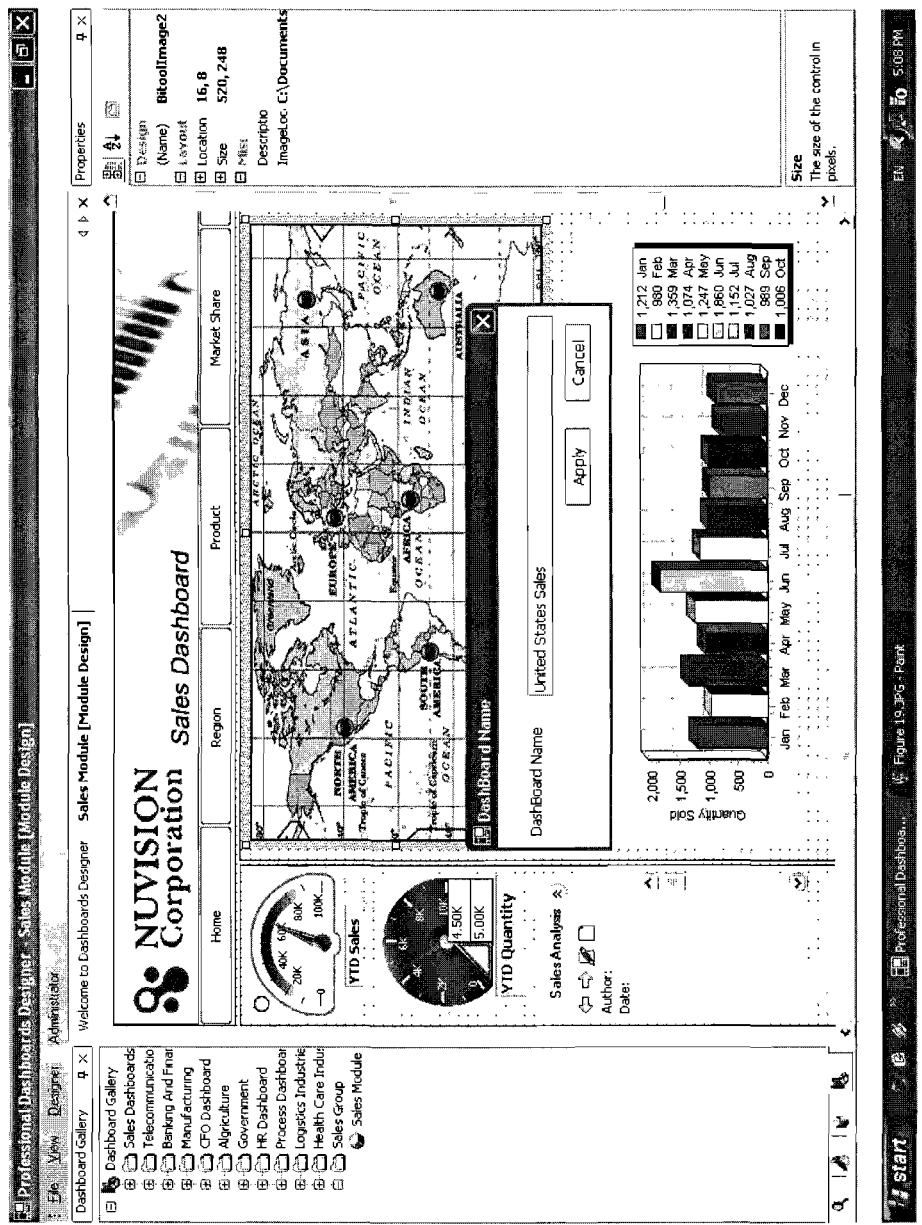
FIG. 20 is a diagram illustrating the Dashboard Gallery. This is for the creation of new dashboards in the multi-level Dashboards for the purpose of navigating relational and/or multidimensional data in accordance with an embodiment of the present invention.

FIG. 20 is a diagram illustrating the Dashboard Gallery. This is for the creation of new dashboards in the multi-level Dashboards for the purpose of navigating relational and/or multidimensional data in accordance with an embodiment of the present invention.

In order to do this, the user first selects the Dashboard Gallery function in the Left Panel by clicking at the corresponding icon at the bottom of the Left Panel.

Once the Dashboard Gallery function is selected, it shows up as the Left Panel. The previous Left Panel will disappear and will be replaced by the new selection—Dashboard Gallery. Now, the user may proceed to enter the name of the new Dashboard to be designed.

The user may proceed to design the new Dashboard by stating the size for the Dashboard. Typically, this size should correspond to the virtual Frame space which will eventually display the Dashboard. It may be bigger or smaller than the targeted virtual Frame space. If it is smaller, there will be some empty space in the Frame once the Dashboard is extracted and displayed in the virtual target Frame space of the Business Module. If it is bigger, the scroll bar(s) may automatically appear (at the bottom and/or right edge of the Frame) when the Dashboard is extracted and displayed in the virtual target Frame space of the Business Module.

The newly designed Dashboard will remain in the Dashboard Gallery until a drill-action is described into one of the Controls to link the newly-created Dashboard. When this happens, the newly-created Dashboard will be transferred to the Module Explorer where it will be extracted for display when the drill path of the Control is activated.

Figure 21:
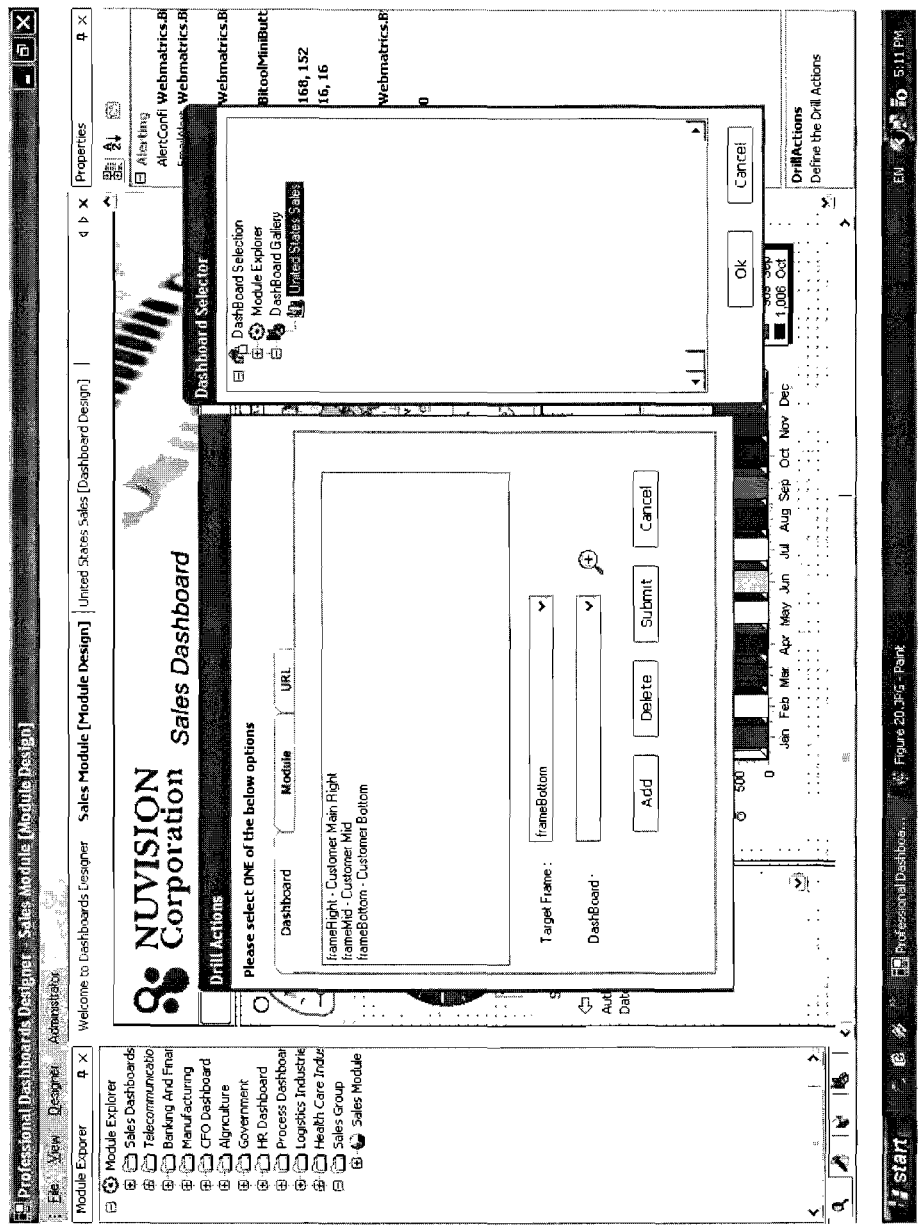
FIG. 21 is a diagram illustrating another one of the Properties functions—the setting of the drill action(s) by selecting the target Frame and Target Dashboard. Optionally, the user may set drill actions to Business Modules, and any other links to targeted URLs (Uniform Resource Locators), websites or applications, etc.

FIG. 21 is a diagram illustrating another one of the Properties functions—the setting of the drill action(s) by selecting:
  i) Dashboards: Select the target Frame and Target Dashboard
  ii) Modules: Select the target Frame or Full Browser Window and Target Module
  iii) URL: Select the target Frame or Full Browser Window and Target URLs In order to do this, the user first selects the Control in the Frame by clicking on the Control. The user may proceed to select the Drill-Action function in the Property function (located at the Right Panel) by clicking at the corresponding description depicted in the Property menu.

Once the Drill-Action function is selected, a 'pop-up' window shows up. Now, the user may proceed to enter the details, e.g. Target Frame and the Target Dashboard. The Target Frame is the virtual Frame space in the Business Module where the Dashboard may be extracted to be displayed. Other than defining Drill-Actions to Dashboard(s), the user has an option to define Drill-Action(s) to Business Modules, URLs for websites or applications as Target(s) to be displayed within the virtual Frame or to be displayed as a Full Browser Window.

The target Dashboard may be in either one (1) of the two (2) locations—Dashboard Gallery or Module Explorer. If it is a newly-created Dashboard, it will be located in the Dashboard Gallery. A newly designed Dashboard will remain in the Dashboard Gallery until a drill-action is described into one of the Controls to link the newly created Dashboard. When this happens, the newly-created Dashboard will be transferred to the Module Explorer where it will be extracted for display when the drill path of the Control is activated.

If the target Dashboard has already been linked by a Drill-Action from another Control, the Dashboard will be located in the Module Explorer of the Business Module. The system allows a target Dashboard to be linked to one (1) or more Controls.

Figure 22:
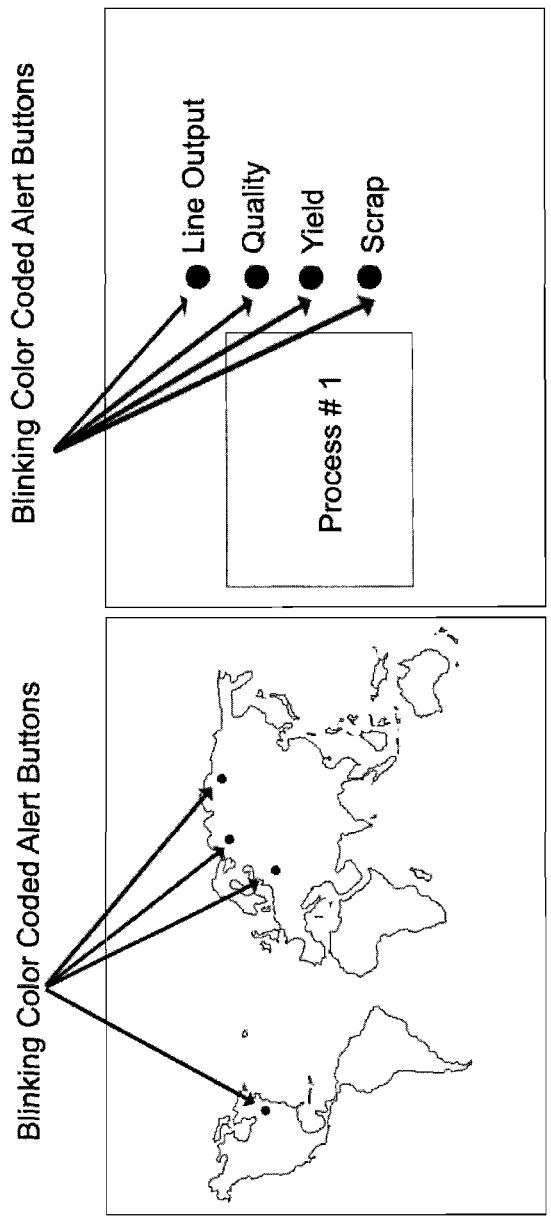
FIG. 22A is a diagram illustrating a method to facilitate better communication and understanding, wherein color-coded buttons are placed over a map image or maps from GIS (Geographical Information System).
FIG. 22B is a diagram illustrating a method to facilitate better communication and understanding, wherein color-coded buttons are placed at the side of a process image.

FIG. 22A is a diagram illustrating a method to facilitate better communication and understanding, wherein color-coded buttons are placed over a map image or maps from GIS (Geographical Information Systems). The GIS maps allow the user to further interact and zoom down to details such as actual locations as provided by the interactive GIS system. This allows the user to quickly visualize the situation or condition of the measurement with respect to the target or threshold in any given location on the map.

FIG. 22B is a diagram illustrating a method to facilitate better communication and understanding, wherein color-coded buttons are placed at the side of a process image. This allows the user to easily visualize the status of several measurements of the process at a glance. If there is an alert condition, the Alert Button which is color-coded will blink in red color. The user may then click on this Alert Button to drill to more details of the alert condition.

Figure 23:
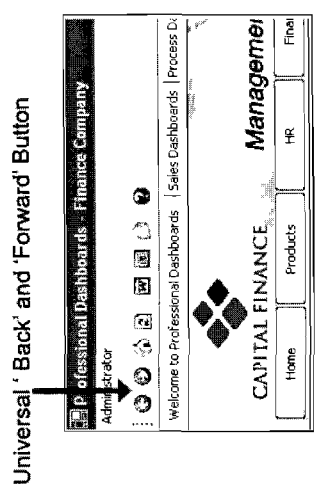
FIG. 23 is a diagram illustrating a method to facilitate better navigations in business modules, wherein a universal 'Back' and 'Forward' is available for all business modules in the Run-Time, user mode.

FIG. 23 is a diagram illustrating a method to facilitate better navigations in business modules, wherein a universal 'Back' and 'Forward' function is available for all business modules in the Run-Time, user mode. This provides a flexible navigation path and eliminates the need to design this feature into every Control.

Figure 24:
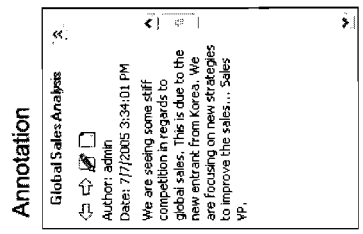
FIG. 24 is a diagram illustrating a method to facilitate better communication and collaboration, wherein a Commentary Box for annotations is provided in the Run-Time, user mode.

FIG. 24 is a diagram illustrating a method to facilitate better communication and collaboration, wherein a Commentary Box for annotations is provided in the Run-Time, user mode. This feature may also be used for the purpose of communicating actions to be taken by the responsible parties in addressing a red alert condition.

Figure 25:
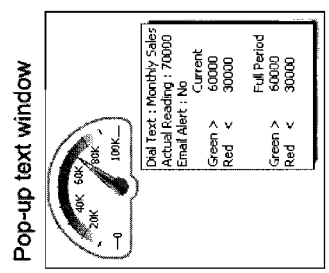
FIG. 25 is a diagram illustrating a method to facilitate better visualization of information, wherein a 'pop-up text window' is provided in the user mode when user's mouse is over the control in the Dashboard, user mode for some of the relevant Controls.

FIG. 25 is a diagram illustrating a method to facilitate better visualization of information, wherein a 'pop-up text window' is provided in the user mode, when the user's mouse is over the control in the Dashboard. To achieve simple and neat visualization, it is sometimes necessary to hide the detailed information. In such a case, the detailed information will only show up as 'pop-up text window' when the user's mouse is over the component. This method of visualization is ideal for the Dials and Alert Buttons.

The 'pop-up text window' may display the details for the Control Name of the Control, the measurements of the Control, the green, yellow and red targets for the Control.

Figure 26:
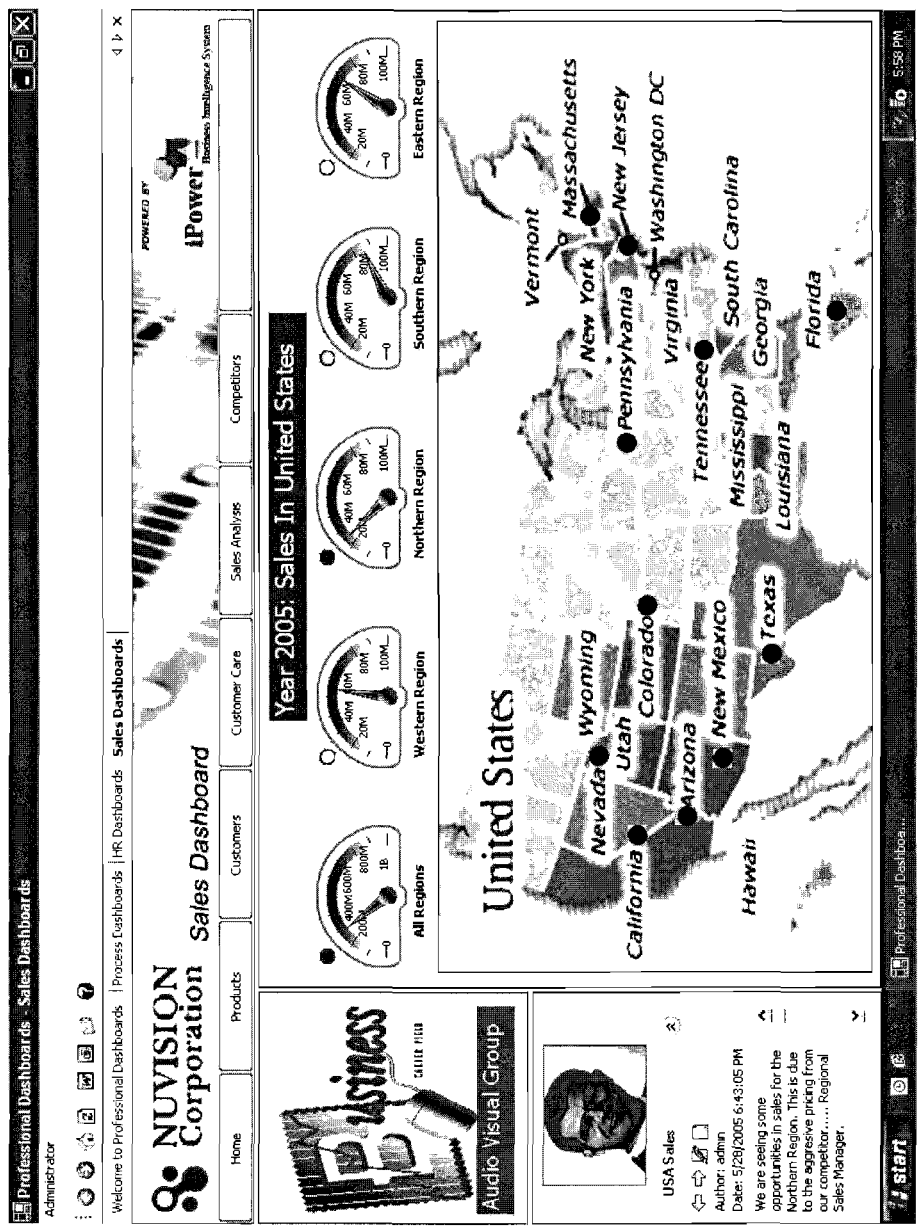
FIG. 26 is a diagram illustrating an example of the navigation and display system in the Run-Time, user mode for a business module named Sales Module.

FIG. 26 is a diagram illustrating an example of the navigation and display system in the Run-Time, user mode for a business module named Sales Module.

Figure 27:
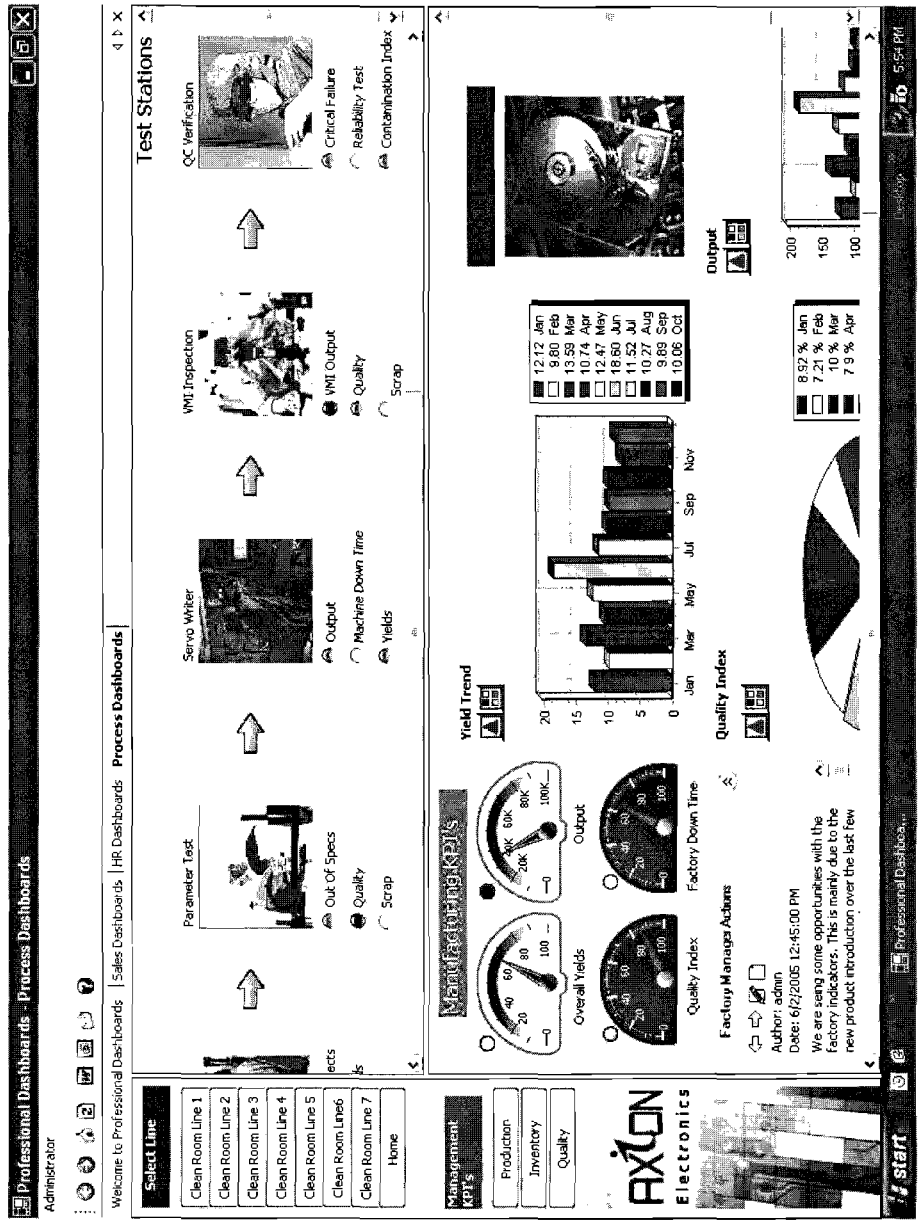
FIG. 27 is a diagram illustrating an example of the navigation and display system in the Run-Time, user mode for a business module named Process Module.

FIG. 27 is a diagram illustrating an example of the navigation and display system in the Run-Time, user mode for a business module named Process Module.

Figure 28:
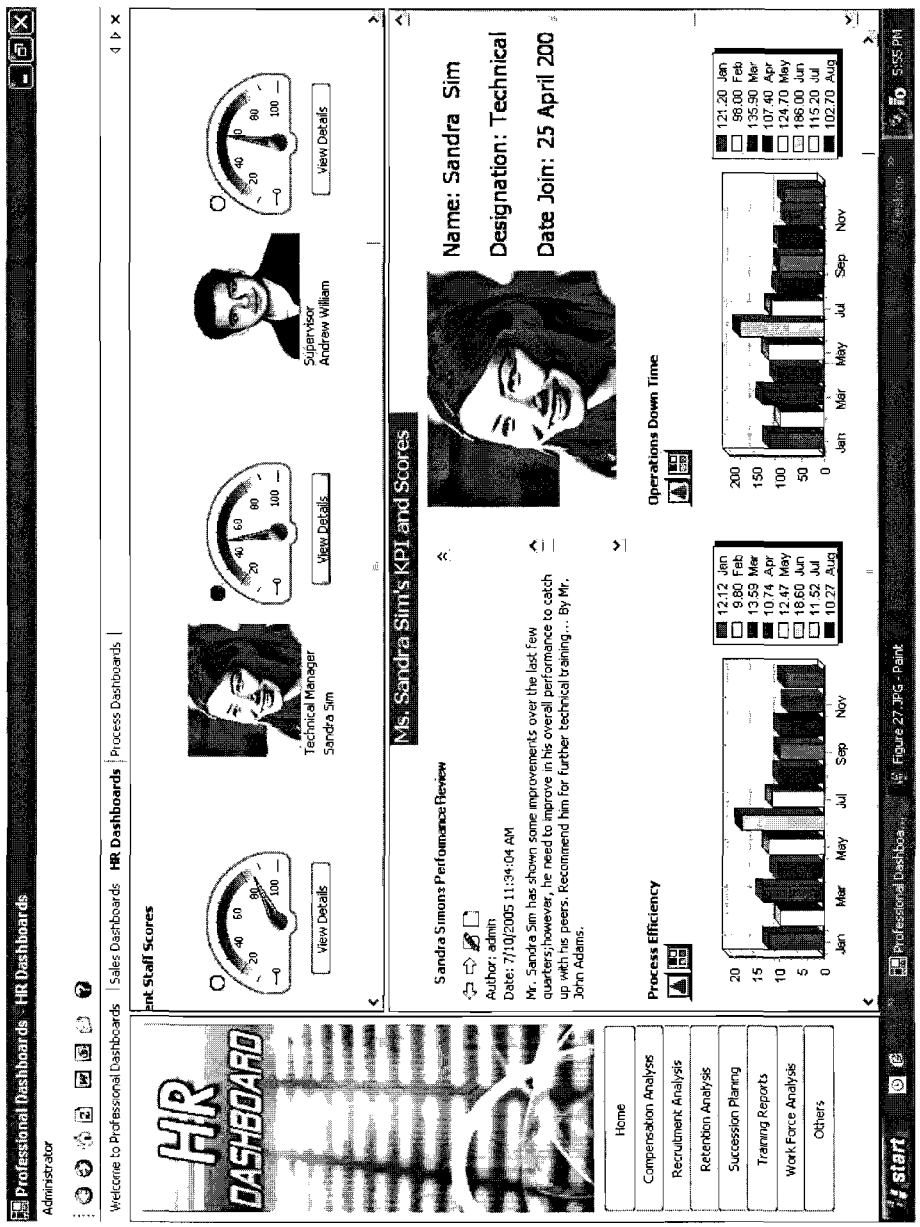
FIG. 28 is a diagram illustrating an example of the navigation and display system in the Run-Time, user mode for a business module named Human Resource Module.

FIG. 28 is a diagram illustrating an example of the navigation and display system in the Run-Time, user mode for a business module named Human Resource Module.

In the examples of business modules of user modes illustrated by FIG. 26, FIG. 27 and FIG. 28, the user may perform relational and/or multidimensional analysis on the charts. New business rules and mathematical calculations may be applied to the charts and results may be view directly in the user mode. The user may Save the new chart formed by the business rules for better analysis of data from the relational and/or multidimensional databases.

The user may perform additional ad-hoc queries to the relational and/or multidimensional databases. The user may Save the new chart from the ad-hoc query for better analysis of data from the relational and/or multidimensional databases.

The user may 'drag and drop' any of the charts onto another chart within the Dashboard or to another Dashboard. The new chart may display data from both the charts. The user may Save the new chart for better analysis of data from the relational and/or multidimensional databases.

Figure 29:
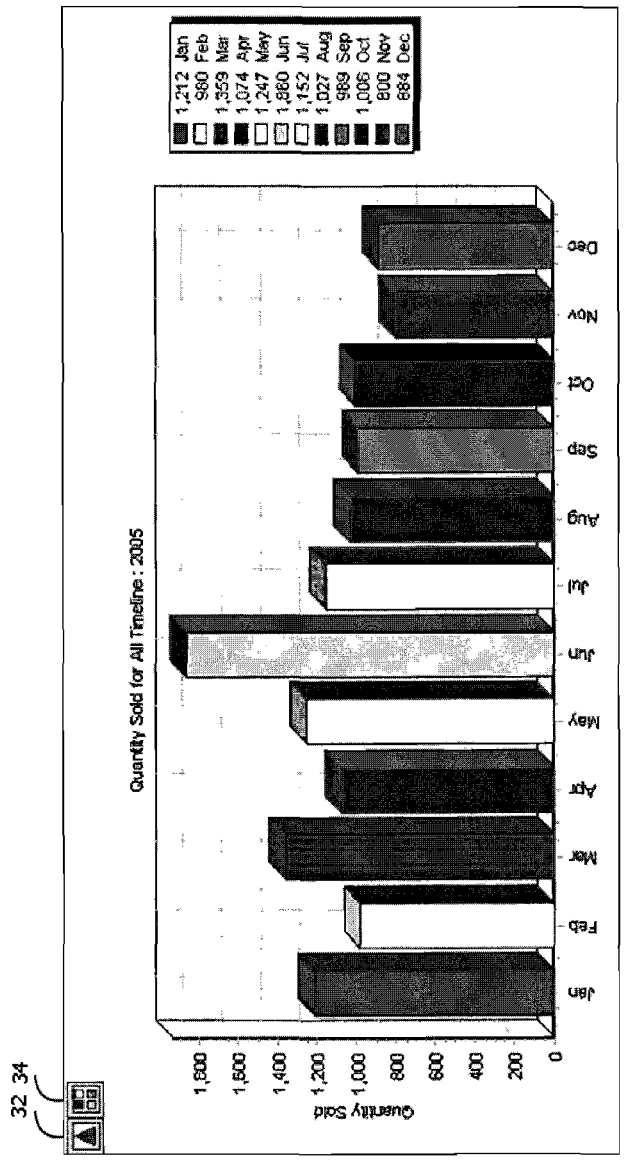
FIG. 29A is a diagram illustrating a method and system to facilitate better chart analysis of relational and/or multidimensional data, a 'drill-up' icon 32 and 'expand and contract chart features' icon 34 are provided in the Run-Time, user mode.
FIG. 29B is a diagram illustrating a method and system to facilitate better chart analysis of relational and/or multidimensional data, wherein more charting features and functions are available when the user clicks on the 'expand mode' icon above the chart, in the Run-Time, user mode.
Figure 29:
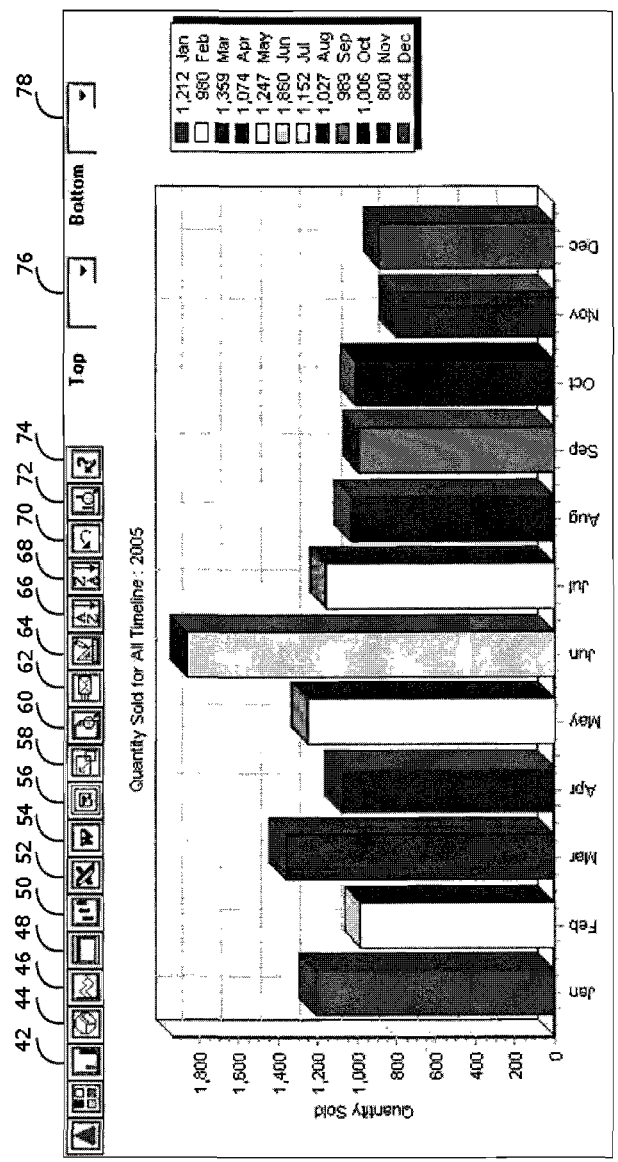

FIG. 29A is a diagram illustrating a method and system to facilitate better chart analysis of relational and/or multidimensional data. A 'drill-up' icon 32 and 'expand and contract chart features' icon 34 are provided in the Run-Time, user mode.

In the analysis of charts, the user may 'drill-down' to analyze the details of the charts by clicking on any of the elements of the chart. After doing this, the user may 'drill-up' by clicking on the icon 32 provided in the user Run-Time mode.

In the analysis of charts, the user may 'expand and contract chart features' by clicking on icon 34 to access more features and functions of the charts.

FIG. 29B is a diagram illustrating a method and system to facilitate better chart analysis of relational and/or multidimensional data, charting features and functions change that are provided in the Run-Time, user mode.

These chart features and functions may be accessed by clicking on the icon 34 which will 'expand' to display more icons for the user to select accordingly. Icon 34 may be clicked again to 'contract' and hide the chart features and functions accordingly.

The following are exemplary, non-limiting chart features and functions:

42 Change chart display to Bar Chart.
44 Change chart display to Pie Chart.
46 Change chart display to Line Chart.
48 Change chart display to Tables.
50 Change chart display to Stack Bar Chart.
52 Export chart display to Microsoft Excel or equivalent applications.
54 Export chart display to Microsoft Word or equivalent documents.
56 Export chart display to Microsoft PowerPoint or equivalent presentation applications.
58 Export chart display to other formats and not limited to JPEG, Bitmaps, XML, text files.
60 Export chart display for print-out in printing devices such as a printer.
62 E-mail chart through the internet, wireless applications or any other communication medium.
64 Apply Business Rules such as Mathematical Functions to the charts.

Apply Change Chart features to change the properties of the chart types. This may include specifying the 'look and feel' of the charts and changing the chart to different types of charts.

The user has the option to 'Save' the new chart for better analysis and visualization.

66 Apply 'Ascending' functions to the display chart so that it will display values from the lowest to the highest value.
68 Apply 'Descending' functions to the display chart so that it will display values from the highest to the lowest value.
70 Apply 'Back to Original' display for the chart.
72 Display the chart in the 'Full Screen' on the computer monitor.
74 Display the 'Top' number of elements based on the chart values.
76 Display the 'Bottom' number of elements based on the chart values.

Figure 30:
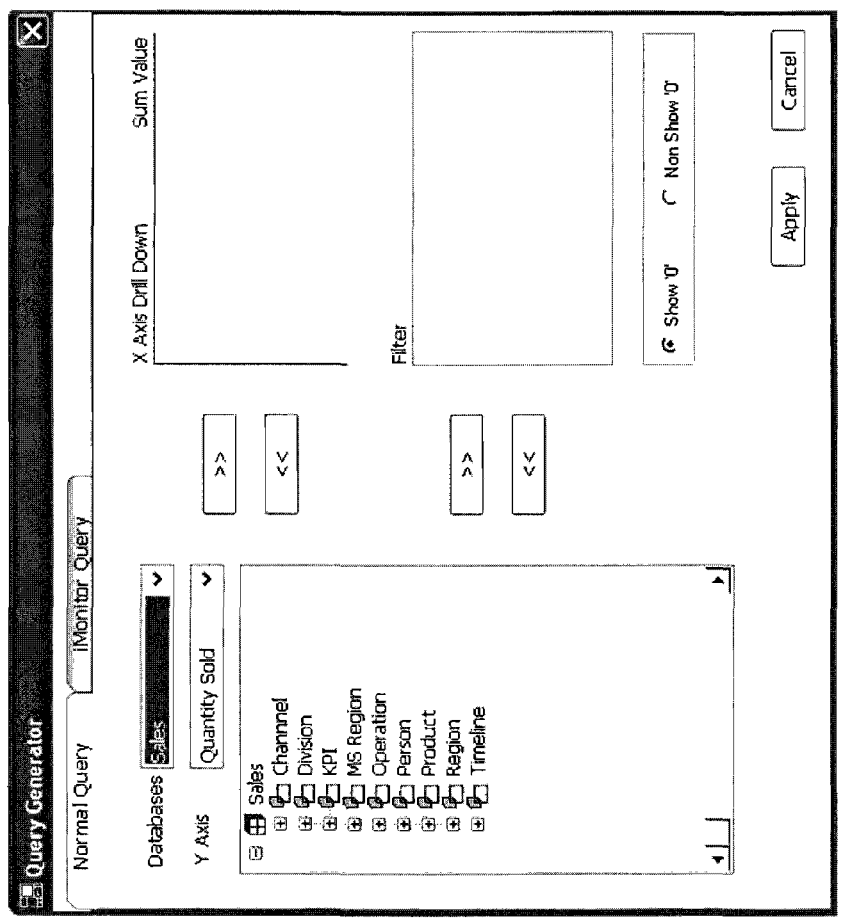
FIG. 30 is a diagram illustrating a method and system to facilitate better chart analysis and ad-hoc query of relational and/or multidimensional data, wherein a Query Generator with Business Rules capabilities and functions is provided in the Run-Time, user mode.

FIG. 30 is a diagram illustrating a method and system to facilitate better chart analysis and ad-hoc query of relational and/or multidimensional data, wherein a Query Generator with Business Rules capabilities and functions is provided in the Run-Time, user mode.

The user may perform an ad-hoc query on relational and/or multidimensional databases using the Query Generator. In addition, Business Rules may be applied to the charts being displayed.

Figure 31:
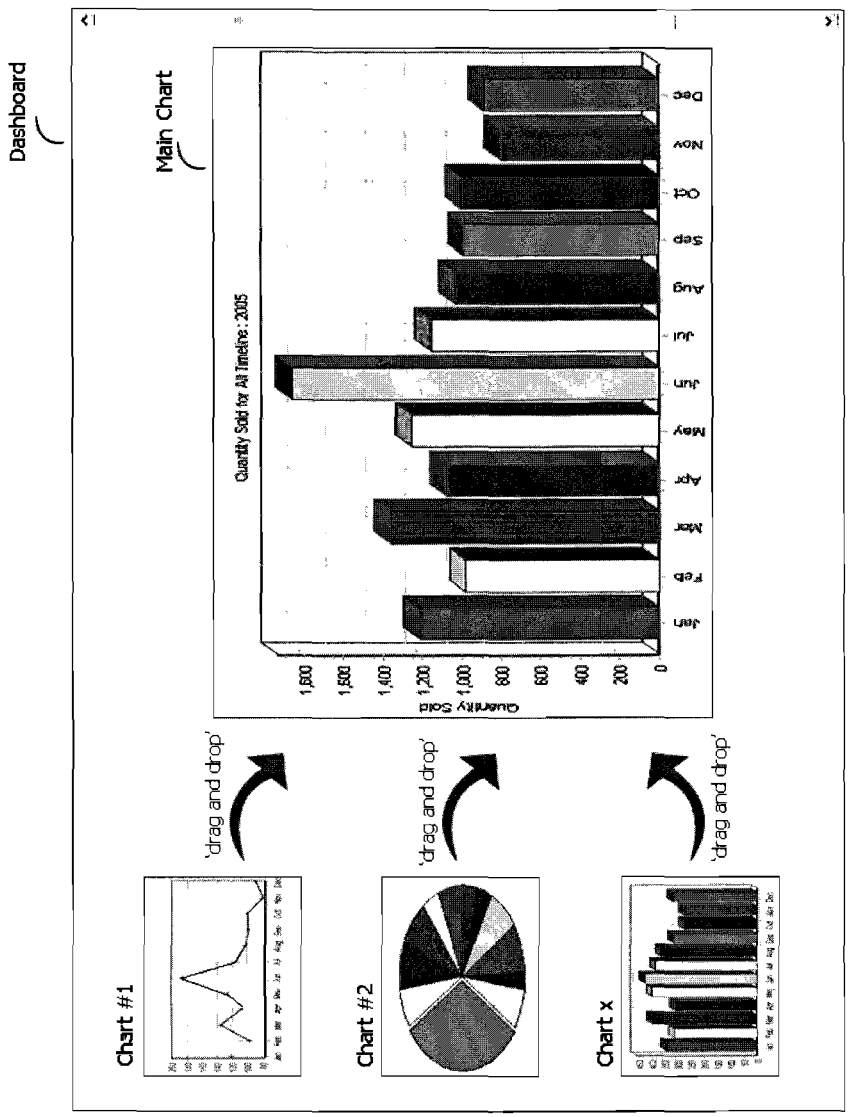
FIG. 31 is a diagram illustrating a method and system to facilitate better chart analysis and ad-hoc query of relational and/or multidimensional data, wherein charts generated by the Query Generator may be combined with other charts or applied with Business Rules, and the results may then be moved by 'drag and drop' to any main charts within the Business Module.

FIG. 31 is a diagram illustrating a method and system to facilitate better chart analysis and ad-hoc query of relational and/or multidimensional data, wherein a Query Generator with Business Rules capabilities and functions is provided in the Run-Time, user mode.

The user may perform an ad-hoc query on relational and/or multidimensional databases using the Query Generator. After each query, a smaller chart will pop-up with the results of the query being displayed. The query may be repeated multiple times, resulting in multiple pop-up charts being displayed. The user may proceed to set Business Rules or mathematical calculations to one or more of the charts. The user may also 'drag and drop' or combine the results of the charts and a new chart with the combined results will be displayed.

The user may 'drag and drop' any of these charts onto another chart (main chart) within the Dashboard or to another Dashboard. The new chart may display data from both the charts. The user may Save the new chart for better analysis of data from the relational and/or multidimensional databases.

Figure 32:
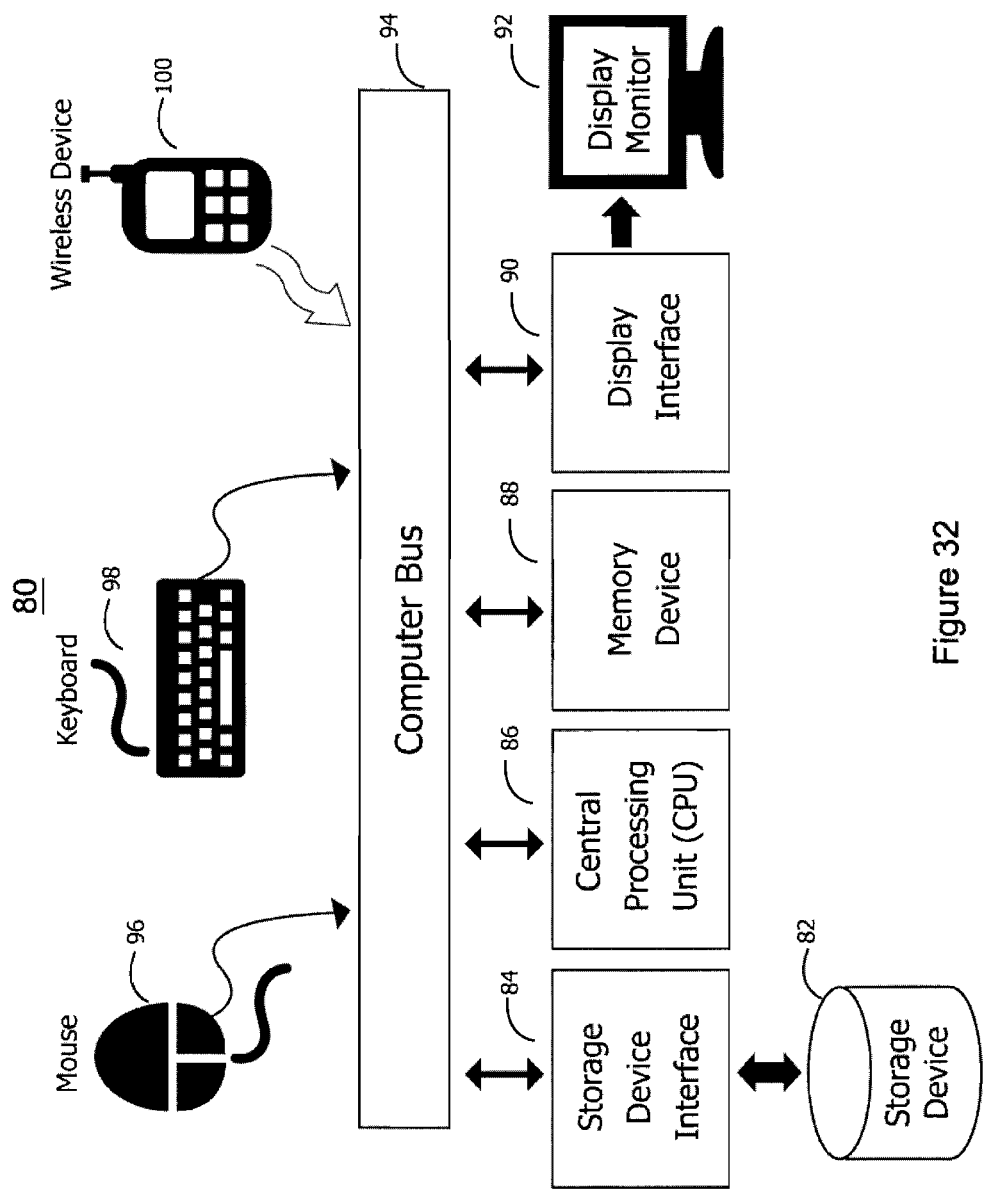
FIG. 32 is a diagram illustrating an example of a computer system environment in which the present invention may be applied, and comprising of storage device, storage device interface, Central Processing Unit (CPU), memory device, display interface, display monitor, computer bus, mouse, keyboard, and wireless device.

FIG. 32 is a diagram illustrating an example of a computer system environment 80 in which the invention may be applied. System environment 80 comprises of storage device 82, storage device interface 84, Central Processing Unit (CPU) 86, memory device 88, display interface 90, display monitor 92, computer bus 94, mouse 96, keyboard 98, and wireless device 100.

Operating with computer bus 94, a mouse 96, keyboard 98 and wireless device 100 are able to provide inputs to the computer system.

The software code, either in its entirety or a part thereof, may be stored in a computer readable memory device 88 or storage device 82 or a combination of both the memory device 88 and the storage device 82. Further, a computer data signal representing the software code which may be embedded in a carrier wave that may be transmitted via a communication network.

The Central Processing Unit (CPU) 86 has access to memory device 88 and storage device 82, and is able to control operations of the computer by executing programs stored in the memory device 88 or storage device 82.

Operating together with the display interface 90, the display monitor 92 is able to provide graphic interface between programs executed and a user.

The method and system for navigation and visualization of data in relational and/or multidimensional databases of the described invention may be implemented by any hardware, software or a combination of hardware and software having the above described functions.

As will be understood, the invention is most suitably realized in software and used in conjunction with a stand-alone or networked computer having standard user-interface devices. The software may be offered to users through a variety of methods such as online purchase and download over fixed line or wireless connection to the Internet, or recorded on a computer program medium of any kind such as optical, magnetic, magneto-optical and solid-state memory. The detailed disclosure herein is sufficient for persons of ordinary skill in the art to write the necessary program code for the described functionality.

The relational and/or multidimensional database(s) may be provided on the same computer system as that running the application of the invention or located remotely and accessed via communication link, or a combination of these options.

While the particular embodiments of the present invention have been shown and described, changes and modifications may be made to such embodiments without departing from the true scope of the invention. Thus, the scope of the invention is not intended to be limited to the illustrations and description of the present invention.

What is claimed is:

1. A computer-implemented method for the visualization and navigation of data retrieved from at least one of a relational or a multidimensional database, the method performed by a computer processor and comprising the steps of:
designing a layout and format of at least one display module by a user to display the data;
partitioning the at least one display module by the user into a plurality of frames including frames A, B and C, wherein each frame has a user-definable size;
inserting controls into each of the plurality of frames by the user, wherein the controls are selected by the user and include any one of: charts, dials, images, icons, text boxes, buttons, or pivot tables;
configuring and user-customizing properties and business rules associated with each of the controls in the frames to create dashboards, wherein a dashboard is a frame with the controls configured;
associating the dashboards by the user into multiple layers for each frame, wherein each layer includes a different dashboard displaying a different type of data in a same frame, the different types of data including any one of: text, graphics, or other data such that frame A includes dashboards A1 through AX, frame B includes dashboards B1 through BY and frame C includes dashboards C1 through CZ where X, Y and Z are integers greater than 1; and
associating actions with the controls by the user in each dashboard, the actions enabling multi-path navigation across different frames and multi-layer navigation through the multiple layers of dashboards within a single frame, whereby activating a single control:
retrieves different content data from the database, the different content data being related to data displayed in the dashboard where the control was activated; and
updates the dashboard displayed in one or more frames, wherein the displayed dashboard includes a different dashboard with the different content data retrieved from the database such that at least one single controls updates a dashboard display of dashboards Ai, in frame A, Bj in frame B and Ck in frame C to a display of dashboards Ai', in frame A, Bj' in frame B and Ck' in frame C where i is not equal to i' and are both integers in the range of 1 to X, j is not equal to j' and are both integers in the range of 1 to Y, and k is not equal to k' and are both integers in the range of 1 to Z.

2. The computer-implemented method according to claim 1, wherein the actions connect to any one of: other display modules, external Uniform Resource Locators (URLs), websites, or applications.

3. The computer-implemented method according to claim 1, wherein:
one of the plurality of frames is adapted to display representations relating to different stages of a process, and
controls in the one frame are associated with the representations, the controls having associated actions for extracting and displaying further information relating to the associated process stage in others of the plurality of frames.

4. The computer-implemented method according to claim 3, further comprising:
comparing a result of a query to the at least one of a relational or a multidimensional database with a target or threshold; and
color-coding the controls based on the comparing.

5. The computer-implemented method according to claim 1, wherein a number of dashboard levels for any one frame is independent of a number of dashboard levels in any other frame.

6. The computer-implemented method according to claim 1, comprising:
using a query generator with business rules capabilities for performing an ad-hoc query on the at least one of a relational or a multidimensional database.

7. A computer-implemented method for the navigation and visualization of data retrieved from at least one of a relational or a multidimensional database, the method performed by a computer processor and comprising the steps of:
partitioning a display screen by a user into a plurality of frames including frames A, B and C, wherein each frame has a user-definable size;
inserting and configuring controls by the user to form a dashboard within each frame, wherein the controls are selected by the user and include any one of: charts, dials, images, icons, text boxes, buttons, or pivot tables, and the controls define queries to the at least one of a relational or a multidimensional database; and
associating the dashboards by the user into multiple layers for each frame, wherein each layer includes a different dashboard displaying a different type of data in a same frame, the different types of data including any one of: text, graphics, or other data such that frame A includes dashboards A1 through AX, frame B includes dashboards B1 through BY and frame C includes dashboards C1 through CZ where X, Y and Z are integers greater than 1;
wherein configuring the controls includes defining actions associated with the controls, the actions relating to target dashboards in any layer, the target dashboards including dashboards within the same frame or in other frames;
whereby the actions enable multi-path navigation across different frames and multi-layer navigation through the multiple layers of dashboards within a single frame, whereby activating a single control:

retrieves different content data from the database, the different content data being related to data displayed in the dashboard where the control was activated; and updates the dashboard displayed in one or more frames, wherein the displayed dashboard includes a different dashboard with the different content data retrieved from the database such that at least one single controls updates a dashboard display of dashboards Ai, in frame A, Bj in frame B and Ck in frame C to a display of dashboards Ai', in frame A, Bj' in frame B and Ck' in frame C where i is not equal to i' and are both integers in the range of 1 to X, j is not equal to j' and are both integers in the range of 1 to Y, and k is not equal to k' and are both integers in the range of 1 to Z.

8. The computer-implemented method according to claim 7, wherein the actions connect to any one of: other display modules, external Uniform Resource Locators (URLs), websites, or applications.

9. The computer-implemented method according to claim 7, wherein a number of dashboard layers for any one frame is independent of a number of dashboard layers in any other frame.

10. The computer-implemented method according to claim 7, further comprising:
using a query generator with business rules capabilities for performing an ad-hoc query on the at least one of a relational or a multidimensional database.

11. A computer-implemented system for the visualization and navigation of data retrieved from at least one of a relational or a multidimensional database, the system executed by a processor and configured to:
design a layout and format of at least one display module by a user to display the data;
partition the at least one display module by the user into a plurality of frames including frames A, B and C, wherein each frame has a user-definable size;
insert controls into each of the plurality of frames by the user, wherein the controls are selected by the user and include any one of: charts, dials, images, icons, text boxes, buttons, or pivot tables;
configure and user-customize properties and business rules associated with each of the controls in the frames to create dashboards, wherein a dashboard is a frame with the controls configured;
associate the dashboards by the user into multiple layers for each frame, wherein each layer includes a different dashboard displaying a different type of data in a same frame, the different types of data including any one of: text, graphics, or other data such that frame A includes dashboards A1 through AX, frame B includes dashboards B1 through BY and frame C includes dashboards C1 through CZ where X, Y and Z are integers greater than 1;
associate actions with the controls by the user in each dashboard, the actions enabling multi-path navigation across different frames and multi-layer navigation through the multiple layers of dashboards within a single frame, whereby activating a single control:
retrieves different content data from the database, the different content data being related to data displayed in the dashboard where the control was activated; and
updates the dashboard displayed in one or more frames, wherein the displayed dashboard includes a different dashboard with the different content data retrieved from the database such that at least one single controls updates a dashboard display of dashboards Ai, in frame A, Bj in frame B and Ck in frame C to a display of dashboards Ai', in frame A, Bj' in frame B and Ck' in frame C where i is not equal to i' and are both integers in the range of 1 to X, j is not equal to j' and are both integers in the range of 1 to Y, and k is not equal to k' and are both integers in the range of 1 to Z; and
saving the dashboards to complete the at least one display module.

12. The system of claim 11, further configured to:
apply new business rules and calculations to the data displayed in a dashboard, to facilitate interaction with and analysis of the data; and
display the results of applying the new business rules and calculations to the data in the dashboard.

13. The system of claim 11, further comprising:
a query generator configured with business rules capabilities and functions, whereby the user may perform an ad-hoc query on the at least one of a relational or a multidimensional database by interacting with data displayed in one of the dashboards.

14. The system of claim 12, further configured to save the results of newly applied rules and calculations as a new element of the dashboard.

15. The system of claim 13, further configured to save the results of the query as a new element of the dashboard.

16. A computer-implemented design tool for the navigation and visualization of data retrieved from at least one of a relational or a multidimensional database, the design tool comprising:
a processor configured to partition a display screen by direction of a user into a plurality of frames including frames A, B and C, wherein each frame has a user-definable size;
the processor configured to insert and configure controls by the user within each frame of the plurality of frames to form a dashboard, wherein the controls are selected by the user and include any one of: charts, dials, images, icons, text boxes, buttons, or pivot tables, and the controls define queries to the at least one of a relational or a multidimensional database, and any rules associated with those queries; and
the processor configured to associate the dashboards by the user into multiple layers for each of the plurality of frames, wherein each layer includes a different dashboard displaying a different type of data in a same frame, the different types of data including any one of: text, graphics, or other data such that frame A includes dashboards A1 through AX, frame B includes dashboards B1 through BY and frame C includes dashboards C1 through CZ where X, Y and Z are integers greater than 1;
wherein the processor is configured to permit the user to associate actions with the controls within each dashboard to target dashboards in any of the layers, the target dashboards including dashboards within the same frame or in other frames;
whereby the actions enable multi-path navigation across different frames and multi-layer navigation through the multiple layers of dashboards within a single frame; and
whereby activating a single control:
retrieves different content data from the database, the different content data being related to data displayed in the dashboard where the control was activated; and
updates the dashboard displayed in one or more frames, wherein the displayed dashboard includes a different dashboard with the different content data retrieved from the database such that at least one single control updates a dashboard display of dashboards Ai, in frame A, Bj in frame B and Ck in frame C to a display of dashboards Ai', in frame A, Bj' in frame B and Ck' in frame C where i is not equal to i' and are both integers in the range of 1 to X, j is not equal to j' and are both integers in the range of 1 to Y, and k is not equal to k' and are both integers in the range of 1 to Z.

\* \* \* \* \*